US012711319B2

(12) United States Patent
Wittekind

(10) Patent No.: US 12,711,319 B2
(45) Date of Patent: Aug. 18, 2026

(54) AUTOMATED GENERAL KNOWLEDGE WORKER

(71) Applicant: AICO Inc., Kirkland, WA (US)

(72) Inventor: Mark Alden Wittekind, El Cerrito, CA (US)

(73) Assignee: AICO Inc., Kirkland, WA (US)

( * ) Notice: Subject to any disclaimer, the term of this patent is extended or adjusted under 35 U.S.C. 154(b) by 200 days.

(21) Appl. No.: 18/241,792

(22) Filed: Sep. 1, 2023

(65) Prior Publication Data

US 2025/0077788 A1 Mar. 6, 2025

(51) Int. Cl.
*G06F 40/40* (2020.01)
*G06F 40/35* (2020.01)
*G06Q 10/0633* (2023.01)

(52) U.S. Cl.
CPC .............. *G06F 40/40* (2020.01); *G06F 40/35* (2020.01); *G06Q 10/0633* (2013.01)

(58) Field of Classification Search
CPC ...... G06F 40/40; G06F 40/35; G06Q 10/0633
See application file for complete search history.

(56) References Cited

U.S. PATENT DOCUMENTS 5,282,265 A * 1/1994 Rohra Suda .......... G06F 40/174 706/46
2023/0062915 A1* 3/2023 Karp ..................... G06F 40/205
2024/0289545 A1* 8/2024 Miller ..................... G06F 40/20
2024/0403367 A1* 12/2024 Dressler .................. G06F 40/35
2024/0403545 A1* 12/2024 Nahum ................. G06F 3/0481
2025/0069617 A1* 2/2025 Carbune ............... G10L 15/183
2025/0077538 A1* 3/2025 Fozdar ...................... G06F 8/20
2025/0077696 A1* 3/2025 Marlin ................. G06N 3/0475
2025/0078823 A1* 3/2025 Fan ......................... G06F 40/35
2025/0139447 A1* 5/2025 Agarwal ................... G06F 9/54

FOREIGN PATENT DOCUMENTS

WO WO-2025029886 A2 * 2/2025 ............. G06Q 10/10

* cited by examiner

*Primary Examiner* — Brian L Albertalli
(74) *Attorney, Agent, or Firm* — Conley Rose, P.C.

(57) ABSTRACT

An automated general knowledge worker may be used to perform knowledge worker tasks. The automated general knowledge worker may receive a text-based request to perform a knowledge worker task for an organization from a computing device. The automated general knowledge worker may search a knowledge base to obtain contextual data of the organization that are relevant to the text-based request. The automated general knowledge worker may provide text information included in the text-based request and the contextual data obtained from the knowledge base in text form to a natural language processor (NLP) to prompt the NLP to generate a new plan of action for performing the knowledge worker task. Subsequently, the automated general knowledge worker may execute the new plan of action to perform the knowledge worker task for the organization.

20 Claims, 11 Drawing Sheets

AUTOMATED GENERAL KNOWLEDGE WORKER

BACKGROUND

Natural language processing is a machine-learning technology that provides computers with the ability to interpret, manipulate, and comprehend human language, such as English. Natural language processing may be performed using various machine-learning approaches, such as neural networks and language models. The most recent development is the use of Large Language Models (LLMs) for natural language processing. These LLMs may be trained using vast amounts of text scraped from the Internet via self-supervised learning or semi-supervised learning. Because LLMs are trained using a large human language corpus, they may contain knowledge about syntax, semantics, and/or other ontology data that are present in human language. Generally speaking, LLMs operate by taking input texts and repeatedly predicting the next token or word that corresponds to the input text. Current examples of LLMs may include ChatGPT® that is developed by OpenAI and the Microsoft Corporation, LLaMA 2 developed by Meta®, Google Bard developed by Google®. In some instances, LLMs can be leveraged to generate human language output based on natural language input or prompts, such as written articles, social media posts, or responses to questions.

SUMMARY

Described herein is an automated general knowledge worker, e.g., a software application or a service, with which human users of an organization can interact using natural language, such as English. The automated general knowledge worker is able to perform knowledge worker tasks, or be taught to perform knowledge worker tasks, that are commonly performed in the organization. Generally speaking, knowledge worker tasks are tasks that include the manipulation of data and/or computerized processes to achieve an end goal.

In various embodiments, a human user of an organization may interact with the automated general knowledge worker using natural language, for example, via chat, email, web form, voice-to-text, etc. The organization worker may make requests of the automated general knowledge worker using natural language. Alternatively, or in addition, the automated general knowledge worker may monitor a data source of an application, an event queue of an application, a signal output of an application, and/or any other suitable status output from an application to detect a condition affecting the organization that causes the automated general knowledge worker to proactively generate a text-based request for a plan of action in response to the condition.

The automated general knowledge worker may attempt to map a request to a previously fulfilled request using any suitable search technique, such as text searching with relevancy determination. Alternatively, or in addition, the automated general knowledge worker may input a text-based prompt that is based at least in part on the request into a natural language processor (NLP) to generate a new plan of action for responding to the request or condition. For example, the NLP may be a Large Language Model (LLM) that is prompted with the text-based request that originated from a human user of the organization and contextual data of the organization that are relevant to the request to generate a plan of action. In some instances, the mapping between a request and a previously fulfilled request may be ambiguous or insufficiently relevant. In such instances, the automated general knowledge worker may indicate to the human user that additional information is required. Once the additional information is provided by the human user, the automated general knowledge worker may leverage the additional information to reattempt the mapping. In some embodiments, plans of action for fulfilling requests may be associated with previously fulfilled requests and may form the basis for a new plan to fulfill the new request.

Once a plan of action is identified or generated, the plan may be executed utilizing any suitable mechanism including programmatic agents and application programming interfaces (APIs). The execution of the plans and their outcomes may be tracked and evaluated. For example, in some instances, the outcomes of the plans may serve as positive and negative examples for future mapping and/or generation of plans.

In some embodiments, the automated general knowledge worker may receive a text-based request to perform a knowledge worker task for an organization from a computing device. The automated general knowledge worker may search a knowledge base to obtain contextual data of the organization that are relevant to the text-based request. The automated general knowledge worker may provide text information included in the text-based request and the contextual data obtained from the knowledge base in text form to an NLP to prompt the NLP to generate a new plan of action for performing the knowledge worker task. Subsequently, the automated general knowledge worker may execute the new plan of action to perform the knowledge worker task for the organization.

In other embodiments, the automated general knowledge worker may receive a text-based request to perform a knowledge worker task for an organization from a computing device. The automated general knowledge worker may map the text-based request to a prior text-based request that was previously successfully fulfilled to perform a previous knowledge worker task. Subsequently, the automated general knowledge worker may execute an existing plan of action associated with the prior text-based request that was previously successfully fulfilled based on one or more parameters in the text-based request to perform the knowledge worker task.

In additional embodiments, the automated general knowledge worker may generate a text-based request to perform a knowledge worker task for an organization in response to a detection of a condition that affects the organization. The automated general knowledge worker may search the knowledge base to obtain contextual data of the organization that are relevant to the text-based request. The automated general knowledge worker may provide text information included in the text-based request and the contextual data obtained from the knowledge base in text form to the NLP to prompt the NLP to generate a new plan of action for performing the knowledge worker task. Subsequently, the automated general knowledge worker may execute the new plan of action to perform the knowledge worker task for the organization.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
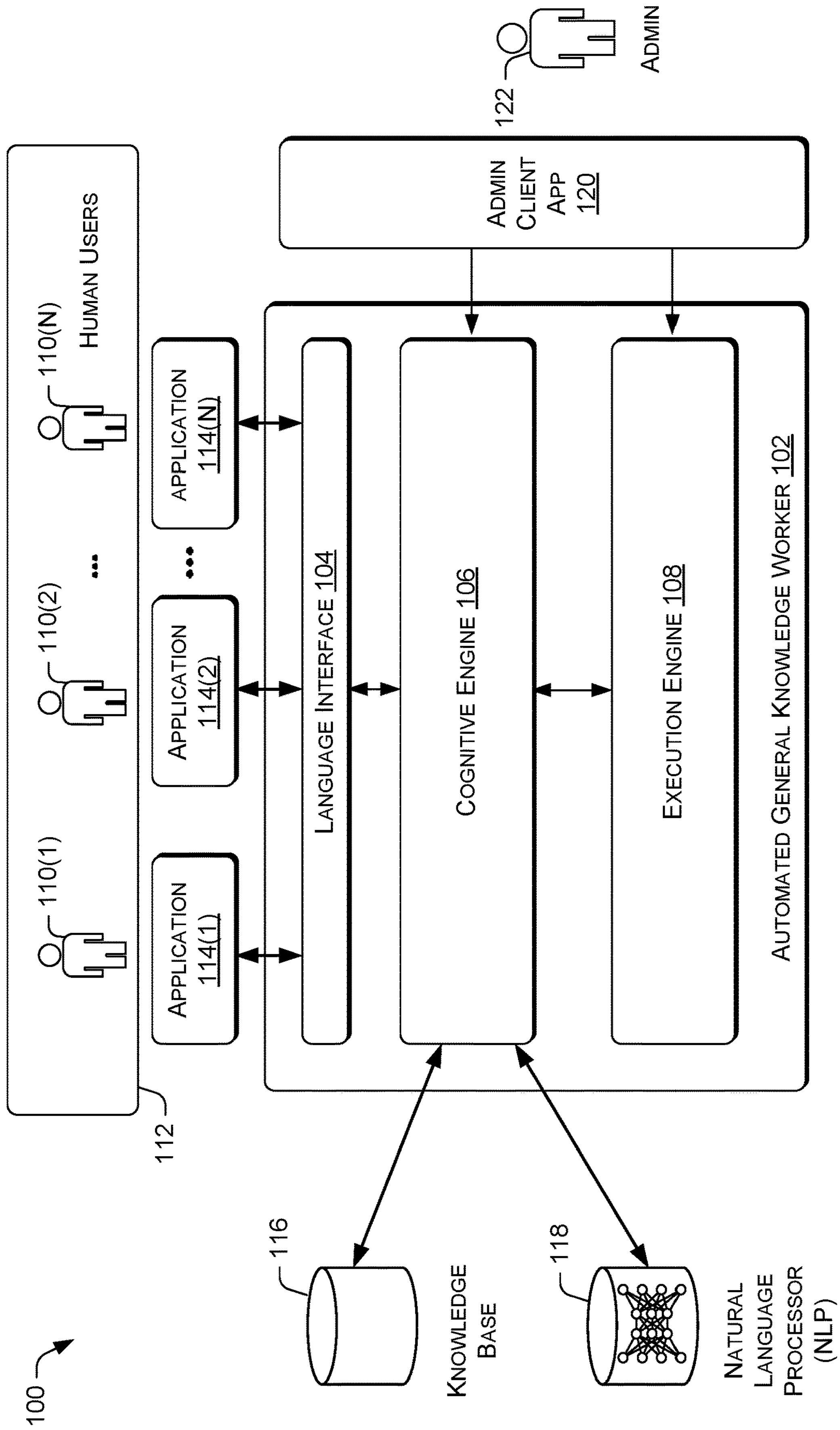
FIG. 1 illustrates an example architecture of an automated general knowledge worker that interacts with a human user of an organization and leverages a natural language processor (NLP) to perform knowledge worker tasks at the request of the human user.

Described herein is an automated general knowledge worker, e.g., a software application or software as a service, with which human users of an organization can interact using natural language, such as English. The automated general knowledge worker is able to perform knowledge worker tasks, or be taught to perform knowledge worker tasks, that are commonly performed in the organization. Generally speaking, knowledge worker tasks are tasks that include the manipulation of data and/or computerized processes to achieve an end goal.

In various embodiments, a human user of an organization may interact with the automated general knowledge worker using natural language, for example, via chat, email, web form, voice-to-text, etc. The organization worker may make requests of the automated general knowledge worker using natural language such as "Please do <job X> based on <data Y>" where <job X> is a known procedure within the organization (or determinable variant thereof) and <data Y> is some data in the organization that prompted or is otherwise related to the request. As another less abstract example, the request might be "Open a trouble ticket based on the email chain titled 'I am getting error 315 when trying to login'." Alternatively, or in addition, the automated general knowledge worker may monitor a data source, an event queue, a signal and/or any suitable action trigger to detect a condition affecting the organization that causes the automated general knowledge worker to proactively generate a text-based request for a plan of action in response to the condition. For example, the automated general knowledge worker may monitor a source control system such as GitHub® to pull requests to review. As another example, the automated general knowledge worker may monitor a ticketing system such as Jira® for new tickets that it is able to progress.

The automated general knowledge worker may attempt to map a request to a previously fulfilled request using any suitable search technique, such as text searching with relevancy determination. Alternatively, or in addition, the automated general knowledge worker may input a text-based prompt that is based at least in part on the request into a natural language processor (NLP) to generate a new plan of action for responding to the request or condition. For example, the NLP may be a Large Language Model (LLM) that is prompted by the text-based request from a human user of the organization and contextual data of the organization that is relevant to the request to generate a plan of action. In some embodiments, the contextual data may include existing plans of action that are mapped to a classification hierarchy of the organization. In some instances, the mapping between a request and a previously fulfilled request may be ambiguous or insufficiently relevant. In such instances, the automated general knowledge worker may indicate to the human user that additional information is required. Once the additional information is provided by the human user, the automated general knowledge worker may leverage the additional information to reattempt the mapping. In some embodiments, plans of action for fulfilling requests may be associated with previously fulfilled requests and may form the basis for a new plan to fulfill the new request.

Example Overall Architecture

FIG. 1 illustrates an example architecture 100 of an automated general knowledge worker that interacts with a human user of an organization and leverages a natural language processor (NLP) to perform knowledge worker tasks at the request of the human user. The example architecture 100 may include an automated general knowledge worker 102. The automated general knowledge worker 102 may be a software application or software as a service (SaaS). The general knowledge worker 102 may include a language interface 104, a cognitive engine 106, and an execution engine 108. The language interface 104 may include software functionalities that enable the automated general knowledge worker to receive text-based requests from human users 110(1)-110(N) of an organization 112 as well as provide text-based output to the human users 110(1)-110(N). For example, the software functionalities may enable the language interface 104 to interact with applications 114(1)-114(N) that are used by the human users 110(1)-110(N) of the organization 112. The applications 114(1)-114(N) may be used by the human users 110(1)-110(N) to send text-based requests for performing knowledge worker tasks to the automated general knowledge worker 102. In various embodiments, the text-based requests and the text-based output may include natural language text, computer language text, and/or any other forms of text. Each of the applications 114(1)-114(N) may execute on a corresponding computing device.

In various embodiments, the applications 114(1)-114(N) may include email applications, trouble ticket applications, instant messaging applications, text messaging applications, interactive voice response (IVR) applications that are reachable via IP-based telephony, project progressing tracking applications, source control system applications, and/or so forth. Accordingly, the language interface 104 may include speech-to-text and/or text-to-speech functionalities. The applications 114(1)-114(N) may include client applications, server applications, cloud applications, and/or so forth. In some embodiments, the language interface 104 may interact with the applications 114(1)-114(N) via application programming interfaces (APIs) of the language interface 104 or the applications 114(1)-114(N), via application functionalities that intercept events and data from the applications 114(1)-114(N), and/or via application functionalities that inject events and data into the applications 114(1)-114(N).

The automated general knowledge worker 102 may access a knowledge base 116 that stores contextual data of the organization 112. The contextual data may include application data, organizational data, task data, and/or plan data that are material to the organization 112. The contextual data may be stored in text form in the knowledge base 116. The application data May include references to applications, available software and/or hardware tools for performing knowledge worker tasks, application program interfaces (APIs), instruction sets (e.g., commands, scripts, applets, and/or so forth) for invoking the applications and tools, references to memory space reserved for storing the processed results of applications, and/or so forth. The organizational data may include facts about the organization that may impact the performance of the knowledge worker tasks. For example, the organizational data may include information from procedural documents, operational manuals, policy documents, emails, chat logs, and/or so forth, that are used by or accessible to the various human users of the organization 112.

The plan data may include data on previously fulfilled text-based requests, as well as preexisting plans of action that have been previously executed to fulfill such requests. For example, a plan of action may have been previously executed to carry out one or more knowledge worker tasks to fulfill a text-based request. Accordingly, the plan of action and the associated text-based request may be stored in the knowledge base. In some embodiments, one or more portions of the contextual data (e.g., the plan data) may be organized in the knowledge base according to a classification hierarchy of the organization 112. The task data may include descriptions of sub-tasks that are capable of being performed using the applications and/or tools of the organization 112. In various embodiments, the sub-tasks may be subcomponents of the plans of action.

Figure 2:
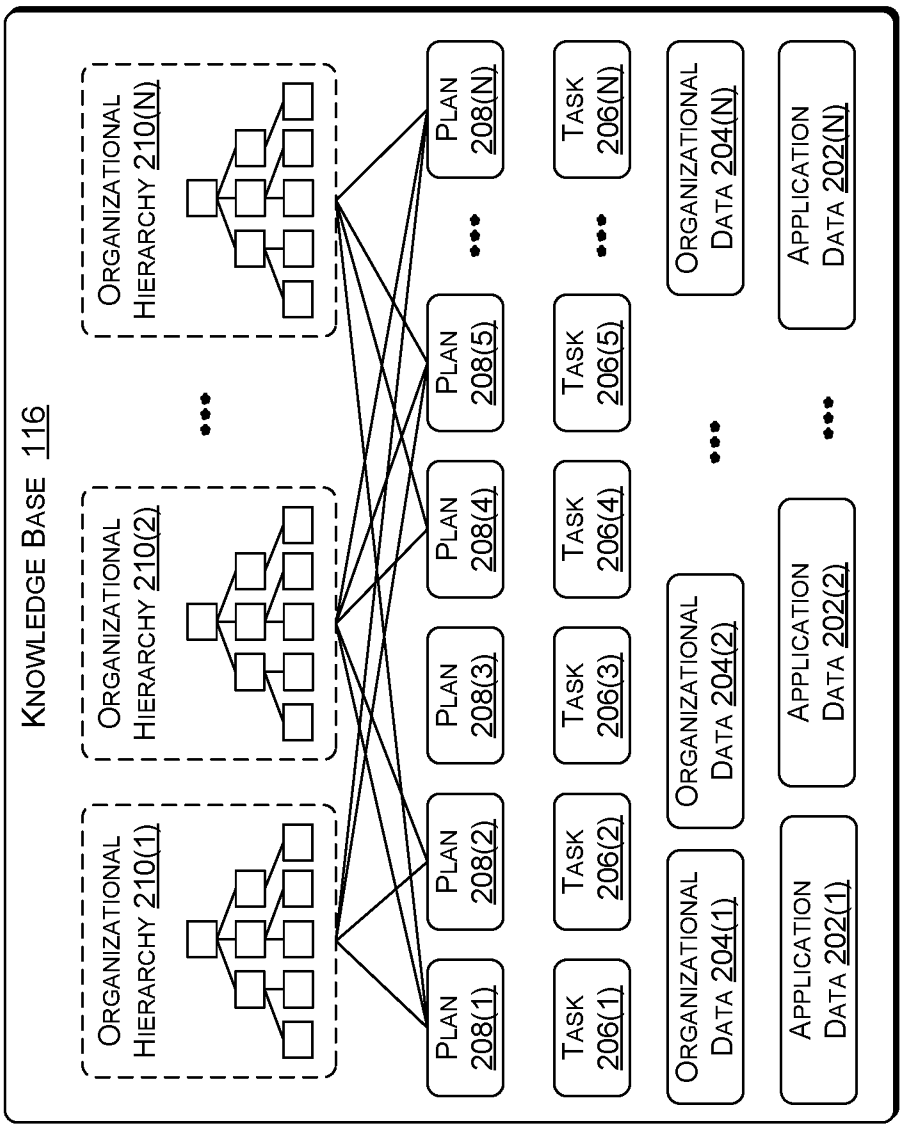
FIG. 2 illustrates an example representation of the organizational data stored in a knowledge base for an organization.

FIG. 2 illustrates an example representation of the organizational data stored in a knowledge base for an organization. As shown in FIG. 2, the information stored in the knowledge base 116 may include application data 202(1)-202(N), organizational data 204(1)-204(N), tasks 206(1)-206(N), plans 208(1)-208(N) and corresponding plan data, classification hierarchies 210(1)-210(N), and/or so forth for the organization.

The information stored in the knowledge base 116 may include information mined from the various applications, such as information collected from emails, instant chat messages, text messages, trouble tickets, etc. The information may be arranged in standardized formats suitable for parameterization and other modifications. In one scenario, a data collection function of the knowledge base 116 may use the NLP 118 to build the knowledge base. For example, the raw data collected about the organization may be fed by the data collection function into the NLP 118 with a text-based prompt for the NLP 118 to convert the raw data into programmatic objects (e.g., JavaScript Object Notation (JSON) objects). In various embodiments, a text-based prompt may include natural language text, computer language text, and/or any other forms of text. In some instances, the prompt for the NLP 118 may include examples of existing programmatic objects and their corresponding raw data that assist the NLP 118 in the conversion. Accordingly, the application data 202(2)-202(N), the organizational data 204(2)-204(N), the tasks 206(2)-206(N), plans 208(2)-208(N) and corresponding plan data, the classification hierarchies 210(2)-210(N), and/or so forth may be stored as programmatic objects in the knowledge base 116. In some embodiments, the programmatic objects stored in the knowledge base 116 may be organized into classes and/or subclasses of objects. For example, the object sub-tasks B and C may be members of the object class Plan A. Thus, in some instances, at least some of the objects stored in the knowledge base 116 may be organized into a structured knowledge representation such as directed acyclic graphs or trees.

The plans 208(1)-208(N) may initially include generic plans of action and their corresponding text-based requests and/or prompts, in which the generic plans of action can act as seed plans for generating new plans of action. Each of the plans may be an ordered set of programmatic objects, and each subcomponent of each plan may include one or more corresponding programmatic objects. The classification hierarchies 210(1)-210(N) may include different types of classification hierarchies for the organization. For example, the classification hierarchies 210(1)-201(N) may include an organizational hierarchy for the organization that has multiple modes (e.g., divisions, departments, teams, roles, and/or other responsibilities within the organization). In another example, the classification hierarchies 210(1)-210(N) may include a technology hierarchy for the organization that has multiple nodes (e.g., different technology areas, components, and/or roles used or managed by the organization). The classification hierarchies 210(1)-210(N) may further include different versions of a particular classification hierarchy. For example, such versions may include an initial generic version of the particular classification hierarchy that is used as a seed version of the particular classification hierarchy. However, as additional data regarding the organization becomes available over time, modified versions of a particular classification hierarchy may be generated based on the additional data and stored in the knowledge base 116 or inputted by a human user into the knowledge base 116. For example, the additional data may be the result of an organizational restructuring of the organization that has taken place. In various embodiments, the additional organizational data (e.g., data extracted from procedural documents, operational manuals, policy documents, emails, chat logs, and/or so forth) collected about the organization along with an existing classification hierarchy may be fed by the data collection function into the NLP 118 as a part of a text-based prompt for the NLP 118 to generate an updated version of the classification hierarchy for the organization. In other embodiments, the data collection function may send a text-based prompt that includes organization data to the NLP 118 to prompt the NLP 118 to generate a classification hierarchy based on the organizational data.

The plans 208(1)-208(N) that are stored in the knowledge base 116 may be further mapped to the classification hierarchies 210-210(N) of the organization for rapid searching and slicing into relevant and irrelevant contextual data for the generation of a new plan of action. The mapping may be performed such that a plan of action correlates to a node in a classification hierarchy, or in some instances, multiple nodes in the same classification hierarchy. Such mapping may be performed by providing a text-based prompt to the NLP 118 via the data collection function, in which the prompt instructs the NLP to map a particular plan of action to one or more corresponding nodes of a specific classification hierarchy. In various embodiments, the text-based prompt may include the particular plan of action, the specific classification hierarchy, and one or more mapping examples that assist with the mapping. The one or more mapping examples may include one or more positive mapping examples in which each example has one or more programmatic objects of an example plan of action that are designated as being correctly mapped to a corresponding node in an example classification hierarchy. In some instances, each positive mapping example is an example in which a human input or a computerized correlation analysis has made the positive designation. Alternatively, or concurrently, the one or more mapping examples may include one or more negative mapping examples in which each example has one or more programmatic objects of an example plan of action that are designated as being incorrectly mapped to a corresponding node in an example classification hierarchy. In some instances, each negative mapping example is an example in which a human input or a computerized correlation analysis has made the negative designation. The mapping examples may be examples that are unique to the organization and/or examples that are extracted for one or more organizations. In various embodiments, a single plan of action may be concurrently mapped to different types of classification hierarchies of the organization and/or different versions of a particular classification hierarchy of the organization.

Returning to the operation in FIG. 1, the cognitive engine 106 may receive a text-based request from a human user (e.g., the human user 110(1)) to perform a knowledge worker task via the language interface 104. For example, the knowledge worker task may be performed with respect to a set of data of the organization 112. In turn, the cognitive engine 106 may determine whether the text-based request to perform the task maps to any prior text-based request that was previously successfully fulfilled with a previous plan of action. For example, the mapping may be performed using various relevancy determination algorithms, such as an algorithm that performs text search with relevancy. Thus, if the text-based request maps to the prior text-based request, the cognitive engine 106 may direct the execution engine 108 to execute the previous plan of action associated with the prior text-based request based on one or more parameters in the text-based request to perform the knowledge worker task requested in the text-based request. In some instances, the one or more parameters may include parameters that specify specific sets of data, specific computerized processes, and/or other parameters that are unique to the text-based request.

However, if the text-based request does not map to any prior text-based request that was previously successfully fulfilled, the cognitive engine 106 may use an NLP 118 to generate a plan of action. In some embodiments, the NLP 118 may be an LLM. Accordingly, the cognitive engine 106 may use a semantic search algorithm to search the knowledge base 116 for contextual data of the organization 112 that are relevant to the text-based request. For example, the contextual data that are relevant to the text-based request may include application data, organizational data, task data, and/or plan data. In some instances, the relevant plan data may include one or more existing plans of action or subcomponents of one or more existing plans of action. In other instances, the relevant plan data may include positive examples of plans of action that successfully fulfilled prior text-based requests and/or negative examples of plans of action that failed to fulfill prior text-based requests. In additional instances, the relevant plan data may include formatting instructions for formatting one or more relevant existing plans or one or more subcomponents of the one or more existing plans into a new plan of action. For example, the plan formatting instructions may specify one or more subcomponents of each existing plan of action that are to be used to generate the new plan of action by the NLP 118. However, in an alternative scenario, the NLP 118 may independently select one or more subcomponents of each existing plan for generating the new plan. In another example, the plan formatting instructions may call for the new plan of action to be formatted by the NLP 118 in natural language form, in machine language form, or in a combination of natural language form and machine language form. Subsequently, the cognitive engine 106 may provide a text-based prompt that includes the text information included in the text-based request and the contextual data that are relevant to the text-based request to the NLP 118 to direct the NLP 118 to generate a new plan of action for performing the knowledge worker task. The text information may be the entirety of the text-based request or a portion of the text-based request. In turn, the NLP 118 may provide the new plan to the cognitive engine 106. Following the receipt of the new plan of action, the cognitive engine 106 may send the new plan of action to the execution engine 108 for execution to perform the knowledge worker task for the organization 112.

In some scenarios, the NLP 118 may return a text-based query for additional information to the cognitive engine 104 as the NLP 118 attempts to generate a plan of action based on the text-based prompt. For example, the NLP 118 may return the text-based query because one or more pieces of information (e.g., application data, data processing parameter values, resource references, and/or so forth) for generating the plan of action may be missing from a corresponding text-based prompt. In turn, the cognitive engine 106 may search the knowledge base 116 for the additional information that is queried by the NLP 118. If the cognitive engine 106 is able to locate the additional information in the knowledge base 116, the cognitive engine 106 may automatically return the additional information to the NLP 118 such that the NLP 118 may continue the generation of the plan of action. However, if the cognitive engine 106 is unable to locate the additional information, the cognitive engine 106 may use the language interface 104 to request the additional information from a human user via the text-based query. In turn, the human user may provide text-based input that includes the additional information. In various embodiments, the text-based query and/or the text-based input may include natural language text, computer language text, and/or any other form of text. Upon receiving the additional information from the human user in text form via the language interface 104, the cognitive engine 106 may send the additional information to the NLP 118 such that the NLP 118 may continue the generation of the plan of action. However, in additional embodiments, the additional information may include information that is both located from the knowledge base and provided by the human user via the language interface 104 from the human user. For example, the human user may input such information using an application on a computing device. Such query interactions between the NLP 118 and the cognitive engine 106 may occur one or more times during the plan generation.

In some instances, the text-based request may ambiguously map to a prior text-based request that was previously successfully fulfilled. For example, such an ambiguous mapping may occur when a mapping algorithm generates a potential mapping with a confidence score that is below a predetermined successful mapping threshold (e.g., 90% confidence value) but which is above a predetermined failed mapping threshold (e.g., 50% confidence value). In such instances, cognitive engine 106 may use text (e.g., natural language text) to request via the language interface 104 for the human user (e.g., the human user 110(1)) to provide additional information in text form via an application (e.g., the application 114(1)). Upon receiving the additional information in the text form, the cognitive engine 106 may supplement the text-based request with the additional information before once again attempting to map the text-based request to any prior text-based request that was previously successfully fulfilled with a previous plan of action.

Alternatively, or in addition, the cognitive engine 106 may monitor a data source of an application, an event queue of an application, a signal output of an application, and/or any other suitable status output from an application (e.g., one of the applications 114(1)-114(N)) to detect a condition affecting the organization that causes the cognitive engine 106 to proactively generate a text-based request for a plan of action in response to the condition. For example, the cognitive engine 106 may monitor a source control system such as GitHub® to pull requests to review and conversion into text-based requests. As another example, the cognitive engine 106 may monitor a ticketing system such as Jira® for new tickets that can be processed as text-based requests. Thus, in some instances, the text-based requests may include non-natural language text data, such as payloads provided by third-party applications (e.g., GitHub®), text-based encoding of computer-aided design (CAD) files, network packet captures (PCAP), and/or other non-natural language text.

The cognitive engine 106 may further track and evaluate the execution outcomes of the plans of action. In such embodiments, the cognitive engine 106 may request feedback via the language interface 104 from a human user regarding the execution of a plan of action to perform a knowledge worker task. Once the feedback is received from the human user via the language interface 104, the cognitive engine 106 may determine whether the feedback indicates that the execution of the plan of action is successful in fulfilling the text-based request to perform the knowledge worker task. In instances in which the plan of action is successful and the plan of action is a new plan that is specifically generated to fulfill the text-based request, the cognitive engine 106 may store the new plan of action in the knowledge base 116, as well as store the text-based request that resulted in the new plan of action in the knowledge base 116 for potential mapping to future text-based requests. Further, the cognitive engine 106 may designate an association of the new plan of action with the text-based request as a positive example for storage as plan data in the knowledge base 116. In instances in which the plan of action is successful and the plan of action is an existing plan, the cognitive engine 106 may designate an association of the existing plan of action with the text-based request as a positive example for storage as plan data in the knowledge base 116.

However, in instances in which the plan of action is not successful and the plan of action is a new plan, the cognitive engine 106 may designate an association of the new plan of action with the text-based request as a negative example along with the new plan of action for storage as plan data in the knowledge base 116. Further, in instances in which the plan of action is not successful and the plan of action is an existing plan, the cognitive engine 106 may designate an association of the existing plan of action with the text-based request as a negative example for storage as plan data in the knowledge base 116. Moreover, regardless of whether the failed plan is a new plan or an existing plan, the cognitive engine 106 may use the language interface 104 to request clarification information from the human user with respect to one or more aspects of the plan of action that failed. Upon receiving the clarification information in text form from the human user via the language interface 104, the cognitive engine 106 may store the clarification information in the text form along with the text-based request and the plan of action as plan data in the knowledge base 116.

The administrative client application 120 may be used by an administrator 122 to interface with the cognitive engine 106 and the execution engine 108. Each of the cognitive engine 106 and the execution engine 108 may provide dashboard interfaces that are accessible via the administrative client application 120. For example, each of the dashboard interfaces may include web pages in the form of HyperText Markup Language (HTML) documents, in which the documents may include text content, images, multimedia content, cascade style sheets (CSS), and/or scripts. In some embodiments, each of the dashboard interfaces may use an application server that supports server-side scripting via multiple scripting languages, such as Active Server Pages (ASP), Hypertext Preprocessor (PHP), JavaScript, and other scripting languages to support the dynamic generation of web pages that presents output and receives input. In various embodiments, the administrative client application 120 may be used by the administrator 122 to perform configuration, tracing, auditing, reporting, and/or other tasks for the cognitive engine 106 and the execution engine 108.

In various embodiments, the automated general knowledge worker 102 may be a service that is provided by an independent entity to the organization 112 and other organizations. Accordingly, while the automated general knowledge worker 102 is depicted in FIG. 1 as providing services to the example organization 112, the automated general knowledge worker 102 may be capable of alternatively or concurrently providing services to additional and/or multiple organizations. Furthermore, as used herein, the term "organization" may refer to any organized group that includes one or more persons. For example, the organization 112 may be a private business or public entity and the human users 110(1)-110(N) may be human workers that perform work for the organization 112. In another example, the organization 112 may be a group of consumers (e.g., a family) and the human users 110(1)-110(N) may be individual consumers that belong to the group (e.g., family members).

Example Components of the Automated General Knowledge Worker

Figure 3:
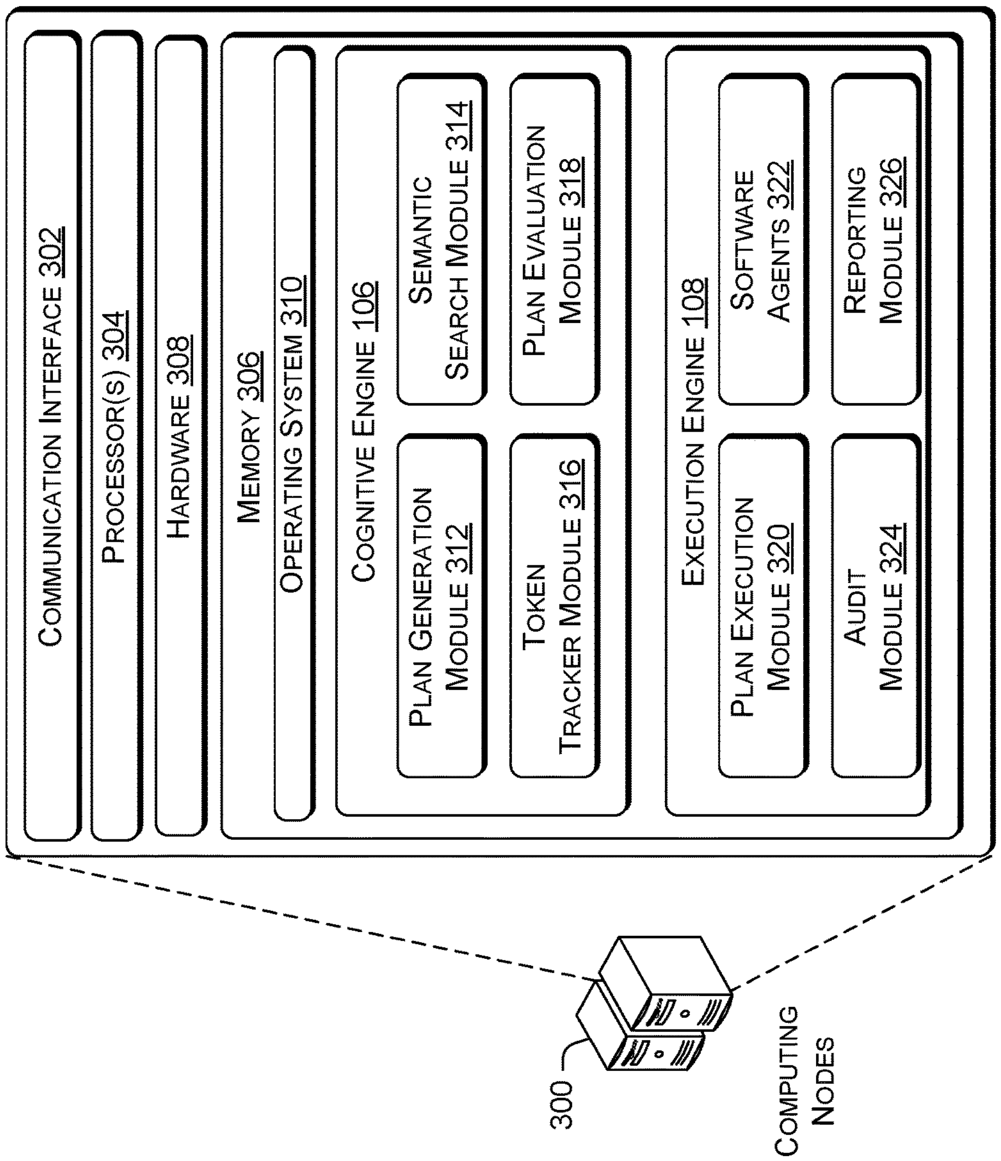
FIG. 3 is a block diagram showing various components of the automated general knowledge worker.

FIG. 3 is a block diagram showing various components of an automated general knowledge worker. The automated general knowledge worker 102 may be executed by one or more computing nodes 300. The computing nodes 300 may include a communication interface 302, one or more processors 304, memory 306, and hardware 308. The communication interface 302 may include wireless and/or wired communication components that enable the computing nodes 300 to transmit data to and receive data from other networked devices. The hardware 308 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 304 and the memory 306 of the computing nodes 300 may implement an operating system 310. In turn, the operating system 310 may provide an execution environment for the automated general knowledge worker 102. The operating system 310 may include components that enable the computing nodes 300 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The operating system 310 may be used to implement the automated general knowledge worker 102 that includes the cognitive engine 106 and the execution engine 108. The cognitive engine 106 may include a plan generation module 312, a semantic search module 314, a token tracker module 316, and a plan evaluation module 318.

The plan generation module 312 may provide a plan of action for an inputted text-based request to perform a knowledge worker task by mapping the text-based request to a previously successfully fulfilled text-based request or prompting the NLP 118 to generate a new plan of action for the text-based request when no mapping is possible. In various embodiments, the mapping may be performed by the plan generation module 312 using any suitable search technique, such as text searching with relevancy determination. For example, the plan generation module 312 may attempt to map a text-based request that is automatically originated or originated by a human user of the organization 112 to any of the one or more previously successfully fulfilled text-based requests that performed knowledge worker tasks for the organization 112. In instances in which the mapping of the text-based request to the previously successfully fulfilled request is ambiguous, or in which the NLP 118 requests additional information during the generation of a new plan of action, the plan generation module 312 may use the language interface 104 to obtain the additional information from a human user that initiated the text-based request. However, in alternative embodiments, rather than querying for additional information to supplement the text-based request in scenarios in which the mapping of a text-based request to a previously successfully fulfilled request is ambiguous, the plan generation module 312 may generalize the ambiguously mapped text-based request to address the nuance in the text-based request and re-attempt the mapping. Furthermore, the plan generation module 312 may monitor various information sources for conditions that automatically trigger the generation of text-based requests. Accordingly, the plan generation module 312 may generate text-based requests for processing into plans of action when such events occur. Additionally, in some instances, the plan generation module 312 may also interface with the NLP 118 such that a request for additional information by the NLP 118 during the generation of a plan of action may result in the plan generation module 312 obtaining the additional information from at least one of a computing device of a human user or the knowledge base 116.

In various embodiments, the plan generation module 312 may include a data collection function that uses the NLP 118 to build the knowledge base 116. The data collection function may feed raw data collected about an organization into the NLP 118 with a text-based prompt for the NLP 118 to convert the raw data into programmatic objects (e.g., JSON objects) that correspond to the application data 202(1)-202(N), the organizational data 204(1)-204(N), the tasks 206(1)-206(N), the plans 208(1)-208(N) and corresponding plan data, the classification hierarchies 210(1)-210(N), and/or so forth. In some instances, the prompt may include positive and/or negative examples that assist the NLP 118 in the conversion. A positive example may include a mapping from a set of raw data to one or more programmatic objects that is designated as successful. For instance, a positive example may be a mapping from "organization data including a chat log that documents a trouble ticket being opened" to "a set of JSON objects that correspond to a plan and possibly plan components that can be used to open a similar trouble ticket." In contrast, a negative example may include a mapping from a set of raw data to one or more programmatic objects that is designated as having failed. For instance, a negative example may be a mapping from "organization data including a chat log that documents a trouble ticket being opened" to "a set of JSON objects that correspond to one or more error codes/descriptions indicating that the mapping failed for some reason." In various embodiments, such designation may be made by a human input or a computerized correlation analysis.

In other embodiments, the data collection function may receive input of seed plans and seed versions of classification hierarchies and convert them into programmatic objects for storage in the knowledge base 116. Additionally, when additional organizational data is collected about an organization, the data collection function may feed the additional organizational data along with an existing classification hierarchy into the NLP 118 as a part of a text-based prompt for the NLP 118 to generate an updated version of the classification hierarchy for the organization. In other embodiments, the data collection function may send a text-based prompt that includes organization data to the NLP 118 to prompt the NLP 118 to generate a classification hierarchy based on the organizational data.

In additional embodiments, the data collection function may use the NLP 118 to map the plans 208(1)-208(N) stored in the knowledge base 116 to the classification hierarchies 210(1)-210(N). The mapping may be performed such that a plan of action correlates to a node in a classification hierarchy, or in some instances, multiple nodes in the same classification hierarchy. In such embodiments, the data collection function may provide a text-based prompt to the NLP 118, in which the prompt instructs the NLP to map a particular plan of action to one or more corresponding nodes of a specific classification hierarchy. In various embodiments, the text-based prompt may include one or more examples that assist with the mapping. In this way, by repeating such mapping for multiple plans of action, the multiple plans of action may be mapped to a classification hierarchy, in which at least some individual plans of action of the multiple plans of action are mapped to different nodes in the classification hierarchy. Alternatively, or concurrently, other individual plans of action of the multiple plans of action may be mapped to the same node in the classification hierarchy. Additionally, a plan of action may be concurrently mapped to different nodes in multiple types of classification hierarchies. Furthermore, since there may be multiple versions of a classification hierarchy that are generated over time, the data collection function may map plans of action to each version of a particular classification hierarchy. In some embodiments, the plan generation module 312 may further store the various mapping data as programmatic objects in the knowledge base 116.

The semantic search module 314 may be used by the plan generation module 312 to search the knowledge base 116 for contextual data of an organization that is relevant to a text-based request that is initiated for the organization. Such contextual data may be in the form of programmatic objects, e.g., JSON objects. In this way, the contextual data that are relevant to the text-based request may be provided by the plan generation module 312 as part of a text-based prompt to the NLP 118 for generating a new plan of action. The search may be conducted by the semantic search module 314 using text based on the words in the text-based request. In some instances, the context related to the text-based request may also be used as a part of the search. For example, the context may include an organizational role of a human user, the job responsibilities of the human user, the projects that are associated with the human user, and/or other relevant data that are obtained from the knowledge base 116 as being related to the human user or inputted by the human user. Other contexts may include the identification information of a data source, a detected condition of an application, a status output of an application, and/or so forth that automatically triggered a text-based request. In various embodiments, the contextual data stored in the knowledge base 116 for an organization may include information regarding an organization that is mined from various applications (e.g., applications 114(1)-114(N)) that are used by the human users of the organization, information that is generated by the automated general knowledge worker 102, information obtained from third-party data sources, and/or so forth. For example, the third-party data sources of contextual data regarding an organization may include various publicly or privately compiled information sources, such as governmental databases, trade organization databases, standards body databases, and/or so forth.

In some instances, since existing plans of action are mapped to one or more classification hierarchies, the search for contextual data that are relevant to a text-based request for performing a knowledge worker task may use a classification hierarchy to narrow down existing plans of action or subcomponents of such plans that are relevant. These existing plans of action or subcomponents of such plans may be in the form of programmatic objects (e.g., JSON objects). For example, when the text-based request and/or the context of a text-based request includes information that matches the data associated with a particular node in the classification hierarchy, the semantic search module 314 may determine that the one or more plans of action that are mapped to the particular node and/or subcomponents of such plans are relevant to the text-based request. Accordingly, in some instances, such plans of action and/or subcomponents of such plans may be provided by the semantic search module 314 to the plan generation module 312 for generating a new plan of action that fulfills the text-based request.

In some embodiments, the semantic search module 314 may be configured to use a particular selected version of a classification hierarchy to narrow down existing plans of action or subcomponents of such plans that are relevant to a text-based request. The particular selected version may be one of multiple versions of the classification hierarchy. For example, the particular version may be a latest version of the classification hierarchy, a default version of the classification hierarchy, or any other version that is manually selected by the administrator 122 via the administrative client application 120. For example, the administrator 122 may select different versions of a classification hierarchy to generate different versions of a plan of action. The different versions may be further stored in the knowledge base 116 for subsequent comparison.

In some embodiments, since the automated general knowledge worker 102 may be a service that is provided by an independent entity to the organization 112 and other organizations, the knowledge base 116 may be a database that is maintained by the entity to store the contextual data of multiple organizations. In such an instance, the plan generation module 312 may attempt to map a text-based request that is automatically originated or originated by a human user of a particular organization to not only previously successfully fulfilled text-based requests of the particular organization, but also attempt to map the text-based request to all previously successfully fulfilled text-based requests across the multiple organizations. In this way, as long as a mapping is found, a plan of action that corresponds to a previously successfully fulfilled text-based request of a first organization of the multiple organizations may in some cases be used to perform a knowledge worker task for a second organization of the multiple organizations. Furthermore, the semantic search module 314 may be configured to search the contextual data of the multiple organizations for contextual data that may be related to a text-based request of one organization. Such a search may provide richer relevant contextual data to a text-based request for the generation of a plan of action than a search on the contextual data of a single organization. However, while the semantic search module 314 is able to search for contextual data across multiple organizations, the contextual data of each organization is secured from access by other organizations. For example, the contextual data of each organization may be stored in an independent access-controlled data storage structure (e.g., an independent database) in the knowledge base 116, such that personnel of each particular organization are only provided with the privilege to access and manipulate the contextual data of that particular organization.

The token tracker module 316 may be used by the plan generation module 312 to track tokens of a text-based prompt that have been inputted to the NLP 118. The text-based prompt may include words from the text-based request and words from the relevant contextual data obtained from the knowledge base 116. In turn, the NLP 118 may include a tokenization function that generates tokens from the words in the text-based prompt for processing by the NLP 118. However, in some cases, the NLP 118 may have an input buffer of a predetermined size (e.g., 256 kilobytes) that is unable to accommodate the entirety of a text-based prompt. Accordingly, the token tracker module 316 may divide the text-based prompt into chunks for input into the input buffer of the NLP 118. In order to perform this task, the token tracker module 316 may track the input progress and the responses of the NLP 118 as each data chunk of the text-based prompt is inputted into the NLP 118 to verify that a corresponding plan of action is generated based on the entirety of the text-based prompt. For example, the token tracker module 316 may change the size of the data chunks in the text-based prompt and re-input the data chunks into the NLP 118 in the event that NLP 118 reports that an error occurred during the processing of the text-based request.

The plan evaluation module 318 may use the language interface 104 to prompt human users of an organization for feedback regarding whether an executed plan of action successfully fulfilled the text-based request to perform the knowledge worker task for the organization. Based on the feedback, the plan evaluation module 318 may generate a positive example or a negative example of an association between the executed plan of action and the corresponding text-based request for storage as plan data in the knowledge base 116. In turn, the positive or negative example may be used as contextual data for the NLP 118 in the future generation of plans of action for text-based requests. In some instances, the plan evaluation module 318 may query for clarification information on the negative examples from a human user via the language interface 104. The clarification information received by the plan evaluation module 318 via the language interface 104 is then stored in the knowledge base as a part of the contextual data for the organization. In other instances, the positive examples may be used by the NLP 118 as contextual data to optimize the generation of new plans. For example, the cost, time, and/or other performance characteristics of a new plan of action may be optimized by the NLP 1108 during generation based on the positive examples and/or the text content of the corresponding text-based requests.

The execution engine 108 may include a plan execution module 320, software agents 322, an audit module 324, and a reporting module 326. The plan execution module 320 may schedule the plans of action that are provided by the cognitive engine 106 for execution. A plan of action may include text that is in natural language form, machine language form, or a combination of both. For example, in some instances, the plan of action may be formatted as a plurality of programmatic objects, such as JSON objects. The plan of action may include directions and parameters for performing one or more tasks. For example, the plan execution module 320 may schedule a plan of action that performs a knowledge worker task on a set of data and/or a computerized process to execute at a date and time that does not interfere with other use of the data and/or other execution of the computerized process. In some embodiments, the plan execution module 320 may implement an execution of a plan of action by directing specific software agents (e.g., one or more of the software agents 322), APIs of applications, and/or other programmatic application mechanisms to execute instruction sets (e.g., machine-executable commands) according to directions and parameters included in the plan of action to perform one or more tasks. Alternatively, or concurrently, the plan execution module 320 may use an interpreter function to translate the text-based (e.g., natural language) directions and parameters included in the plan of action into machine-executable commands for specific software agents, APIs of applications, and/or other programmatic application mechanisms, and then send the machine-executable commands to such mechanisms at the appropriate date and time for execution to perform one or more tasks. Since a plan may include a series of steps, e.g., tasks to be performed, the performance each task by the plan execution module 320 may include reserving short-term memory space for storing the processed result of a task so that the result may be further processed in a subsequent task.

The audit module 324 may monitor and track the changes that are implemented on the various data and/or computerized processes that are executed as the result of performing knowledge worker tasks according to plans of action. The audit module 324 may also track other variables that are related to the data and/or computerized processes. For example, such variables may include cost increases or decreases that resulted from the changes or execution, amount of computing resources consumed as a result of the changes or executions, effect on the amount of human user time expended due to the changes or executions, and/or so forth. In some instances, the audit module 324 may provide software mechanisms for tracing and rolling back the changes or executions that are implemented due to the performance of a knowledge worker task. In other instances, the audit module 324 may include a comparison function that is used to compare different versions of a plan of action that are generated based on different versions of a classification hierarchy, such that the differences between the versions of the plan of action may be presented to a human user.

The reporting module 326 may generate reports related to the execution of plans of action to perform knowledge worker tasks, changes that are made to specific data and/or computerized processes that are executed as a result of the knowledge worker tasks, variables that are affected by the performance of the knowledge worker tasks, and/or so forth. The reporting module 326 may further generate reports related to the operation of the cognitive engine 106. For example, reports may be generated on the text-based requests processed, the plans of action executed for the text-based requests, the success and/or failure rate for the plans of action, and/or so forth. The reporting module 326 may provide such reports to the administrator 122 via the administrative client application 120.

Example Computing Environment

Figure 4:
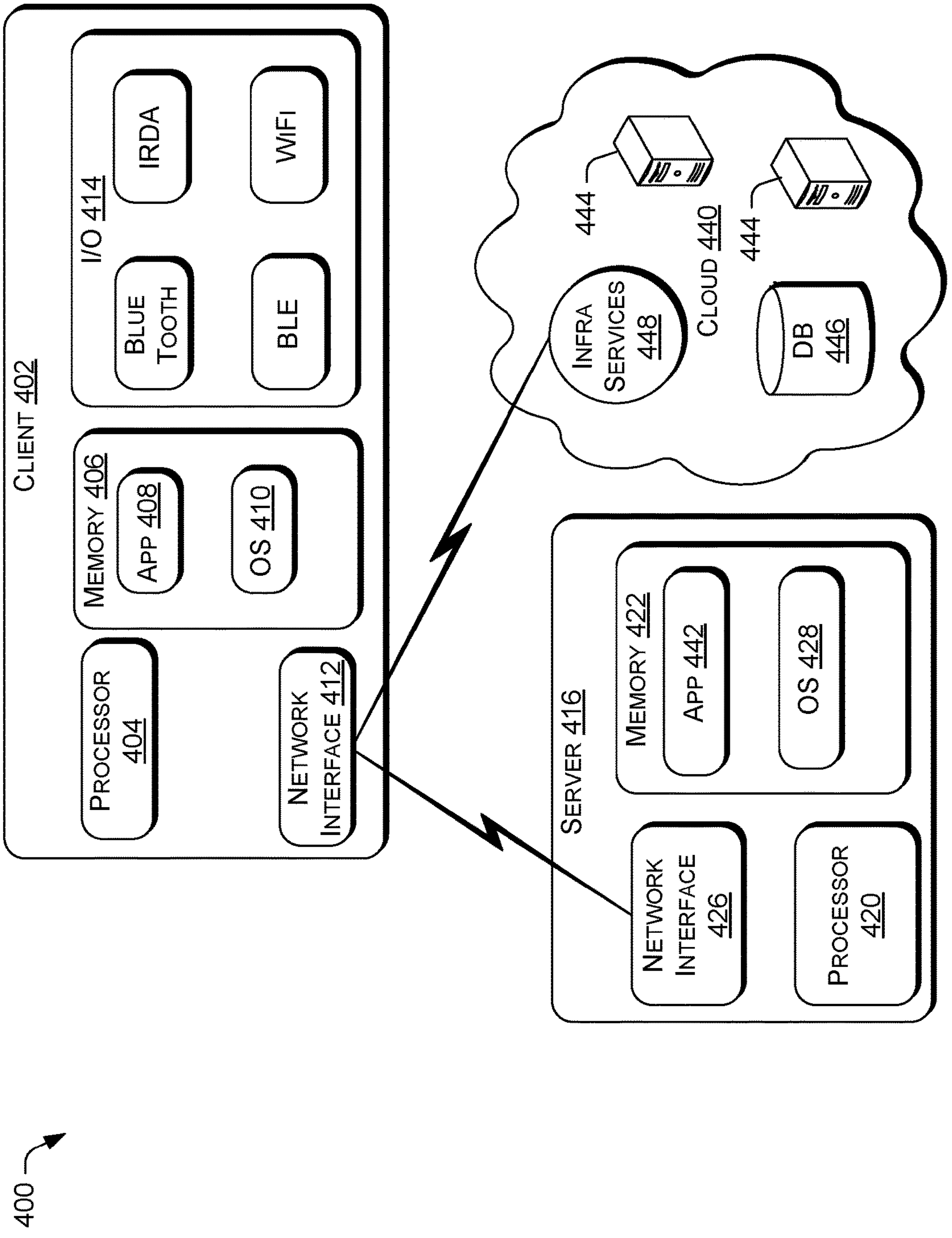
FIG. 4 is a block diagram showing various components of a computing environment for implementing the automated general knowledge worker.

FIG. 4 is a block diagram showing various components of a computing environment for implementing the automated general knowledge worker. The computing environment 400 is generally hosted on computing devices. Exemplary computing devices include without limitation on the client-side: mobile devices (including smartphones), tablet computers, laptops, and embedded systems suitable for hosting IoT sensors and add-on devices. Exemplary computing devices on the server-side include without limitation: mainframes, physical servers, and virtual machines. Generally, the computing devices are networked.

A client-side computing device 402, or client device for short, may have a processor 404, and a memory 406. The processor may be a central processing unit, and/or a dedicated controller such as a microcontroller. Memory 406 is any computer-readable media that may store several software components including applications 408, an operating system 410, and/or other software components. The applications 408 may include an internet browser or application integrating internet browsing capability. In general, a software component is a set of computer-executable instructions stored together as a discrete whole. Operating system 410 and applications 408 are themselves software components or integrated aggregations of software components. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

The client computing device 402 may further include a network interface 412 and/or an input/output (I/O) interface 414. The network interface 412 may potentially work in concert with the I/O interface 414 and may be a network interface card supporting Ethernet and/or Wi-Fi and/or any number of other physical and/or datalink protocols. Alternatively, the network interface 412 may be an interface to a cellular radio.

The I/O interface 414 may be any controller card, such as a universal asynchronous receiver/transmitter (UART) used in conjunction with a standard I/O interface protocol such as RS-232 and/or Universal Serial Bus (USB). Client devices 402 range widely in form factors. For the smaller form factors, in particular for embedded systems and IoT devices, communications protocols supported by the network interface 412 in conjunction with the I/O interface 414 include without limitation BlueTooth™, BlueTooth Low Energy (BLE), Infrared (IRDA), and Zigbee™.

The server-side computing device 416, or server for short, is any computing device that may participate in a network. The network may be, without limitation, a local area network (LAN), a VPN, a cellular network, or the Internet. The server 416 has hardware components analogous to the client-side computing device 402. Specifically, it will include a processor 420, a memory 422, an input/output interface 424, and/or a network interface 426. The memory 422 may store an operating system 428 and applications 432. Server hardware 416 differs from client hardware 402 in that processing power is generally more powerful to handle concurrent processes running and network capacity is greater to communicate with multiple clients 402. Server-side applications 432 may include libraries and run-times (e.g., to run interpreted code). Server-side applications 432 may include not only web servers (also called application servers) and databases, but also server software providing functionalities to the computing environment 400.

In general, software of the computing environment 400 may be implemented as a software service on a physical server 416. However, such a software service may also be hosted on the cloud 430 via a cloud service 438. Specifically, a cloud service 438 is comprised of multiple physical computer servers which are disaggregated via a hypervisor. The physical computer servers each may have one or more processors, memory, at least I/O interface, and/or network interface. The features and variations of the processors, memory, the I/O interface, and the network interface are substantially similar to those described for the physical computer server 416 described above.

A cloud service 438 includes a hypervisor that can delegate calls to any portion of hardware in the underlying physical servers, and upon request generate a virtual machine from the separate portions of hardware, regardless of physical server (a process called disaggregation). Just as a physical server 416, a virtual machine may host not only software applications, components including services, but also virtual web servers 434 functionality and virtual storage/database 436 functionality.

Note that virtual machines themselves may be further partitioned into containers, which enable the execution of a program in an independent subset of the virtual machine. Software such as Kubernetes, Mesos, and Docker are examples of container management software. Unlike virtual machines which have a delay in startup due to the need for provisioning an entire OS, containers may be generated more quickly and on-demand since the underlying virtual machine is already provisioned. The cloud service 438 may embody an abstraction of services. Common examples include service abstractions such as Platform as a Service (PAAS), Infrastructure as a Service (IAAS), and Software as a Service (SAAS). The various software components of the computing environment 400 (e.g., engines, modules) may be implemented via the server 416 and/or the cloud 430. Such components may be implemented using computer routines, program instructions, objects, and/or data structures that perform particular tasks or implement particular abstract data types. However, in other embodiments, one or more computing devices may be deployed in an offline environment and function independently of other computing devices in implementing the automated general knowledge worker. In such embodiments, such a computing device may include a drone, a humanoid robot, an in-vehicle computing device, and/or so forth.

Example Processes

FIGS. 5-9 present illustrative processes 500-900 for implementing an automated general knowledge worker that leverages an NLP to perform knowledge worker tasks at the request of a human user. Each of the processes 500-900 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500-900 are described with reference to the architecture 100 of FIG. 1.

Figure 5A:
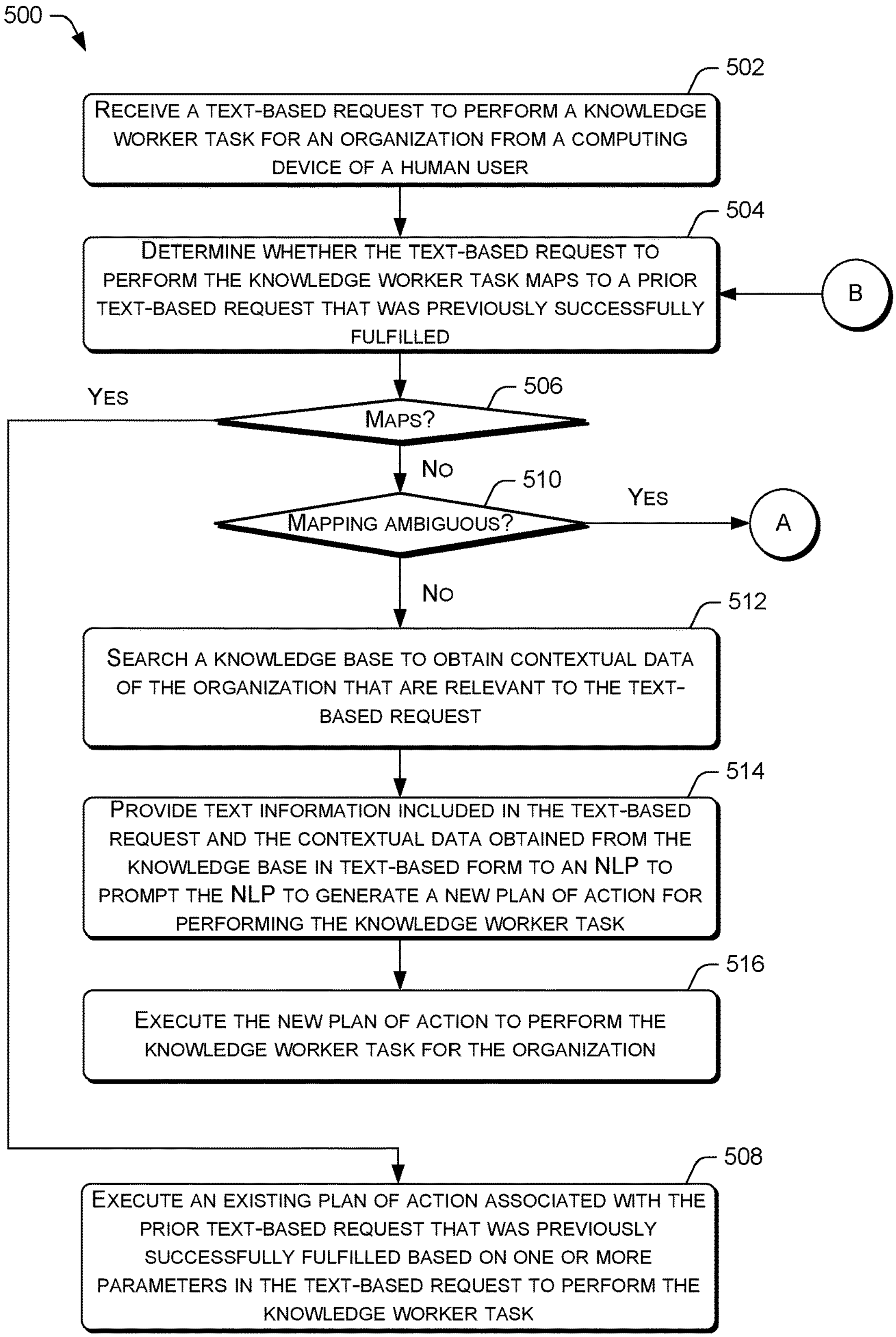
FIGS. 5*a* and 5*b* illustrate a flow diagram of an example process for identifying a plan of action or generating a plan of action via an NLP to perform a knowledge worker task in response to a request from a human user.
Figure 5B:
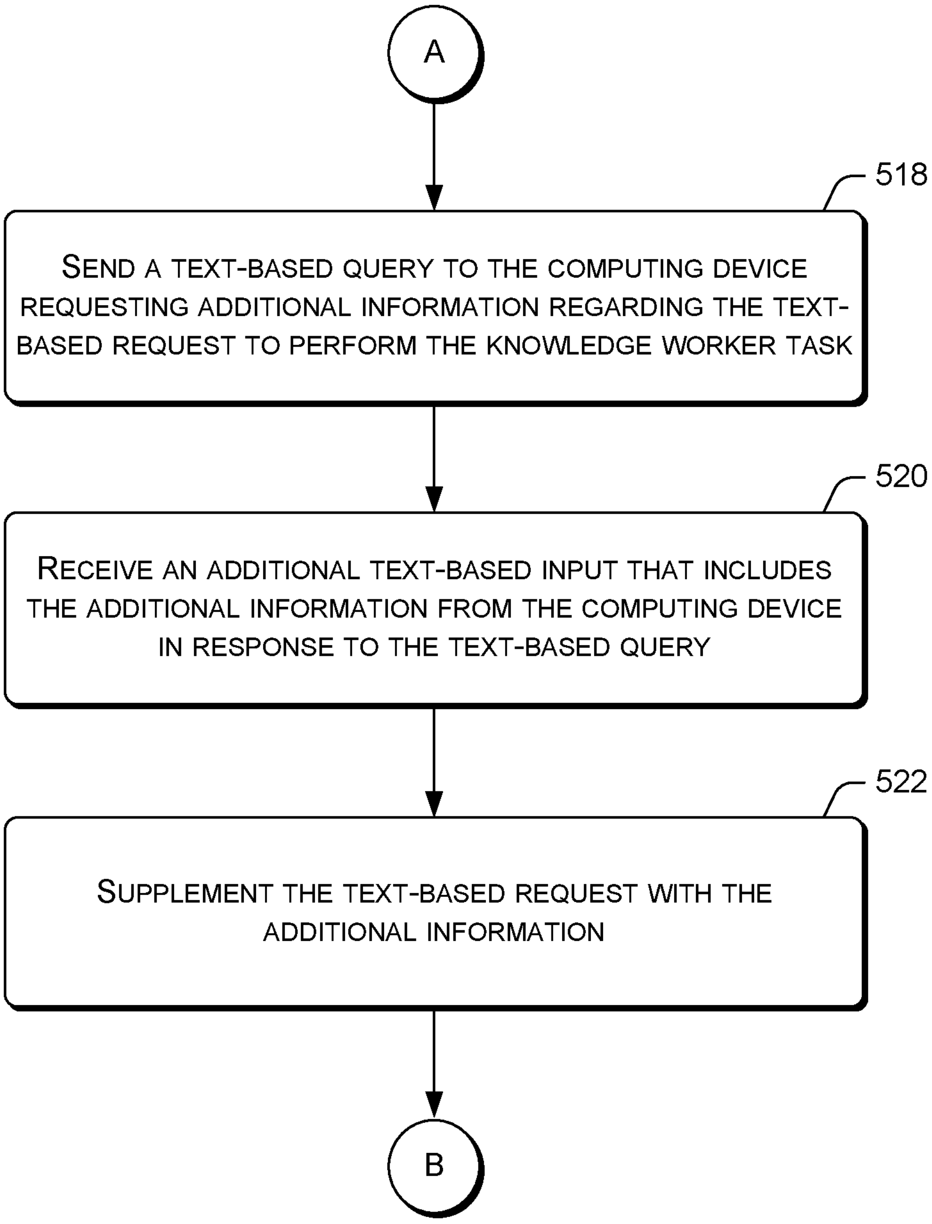

FIGS. 5*a* and 5*b* illustrate a flow diagram of an example process 500 for identifying a plan of action or generating a plan of action via an NLP to perform a knowledge worker task in response to a request from a human user. At block 502, the automated general knowledge worker 102 may receive a text-based request to perform a knowledge worker task for an organization from a computing device of a human user. The text-based request may be inputted to the automated general knowledge worker 102 by the human user via an application executing on the computing device. In alternative embodiments, a detected condition may trigger the automated general knowledge worker 102 to proactively generate a text-based request.

At block 504, the automated general knowledge worker 102 may determine whether the text-based request to perform the knowledge worker task maps to a prior text-based request that was previously successfully fulfilled. In various embodiments, the prior text-based request was previously successfully fulfilled to perform a corresponding knowledge worker task for the organization or another organization. At decision block 506, if the text-based request maps to the prior text-based request ("yes" at decision block 506), the process 500 may proceed to block 508. At block 508, the automated general knowledge worker 102 may execute an existing plan of action associated with the prior text-based request that was previously successfully fulfilled based on one or more parameters in the text-based request to perform the knowledge worker task.

Returning to decision block 506, if the text-based request does not map to the prior text-based request ("no" at decision block 506), the process 500 may proceed to decision block 510. At decision block 510, the automated general knowledge worker 102 may determine whether the mapping between the text-based request and the prior text-based request is ambiguous despite not positively matching. For example, an ambiguous mapping may occur when a mapping algorithm generates a potential mapping with a confidence score that is below a predetermined successful mapping threshold (e.g., 90% confidence value) but which is above a predetermined failed mapping threshold (e.g., 50% confidence value). Thus, if the mapping is not ambiguous ("no" at decision block 510), the process 500 may proceed to block 512. At block 512, the automated general knowledge worker 102 may search a knowledge base to obtain contextual data of the organization that are relevant to the text-based request. For example, the contextual data that are relevant to the text-based request may include application data, organizational data, task data, and/or plan data. In some instances, the relevant plan data may include one or more existing plans of action or subcomponents of one or more existing plans of action.

At block 514, the automated general knowledge worker 102 may provide text information included in the text-based request and the contextual data obtained from the knowledge base in text form to an NLP to prompt the NLP to generate a new plan of action for performing the knowledge worker task. At block 516, the automated general knowledge worker 102 may execute the new plan of action to perform the knowledge worker task for the organization.

Returning the decision block 510, if the mapping is ambiguous ("yes" at decision block 510), the process 500 may proceed to block 518. At block 518, the automated general knowledge worker 102 may send a text-based query to the computing device requesting additional information regarding the text-based request to perform the knowledge worker task. In various embodiments, the text-based query may be presented to the human user of the organization via an application executing on the computing device.

At block 520, the automated general knowledge worker 102 may receive an additional text-based input that includes the additional information from the computing device in response to the text-based query. In various embodiments, the additional information may be inputted by the human user of the organization via an application on a computing device. At block 522, the automated general knowledge worker 102 may supplement the text-based request with the additional information. Subsequently, the process 500 may loop back to block 504. However, in alternative embodiments, rather than querying for additional information to supplement the text-based request via blocks 518-522, the automated general knowledge worker 102 may generalize the ambiguously mapped text-based request to address the nuance in the text-based request and then loop back to block 504 to re-attempt the mapping.

Figure 6A:
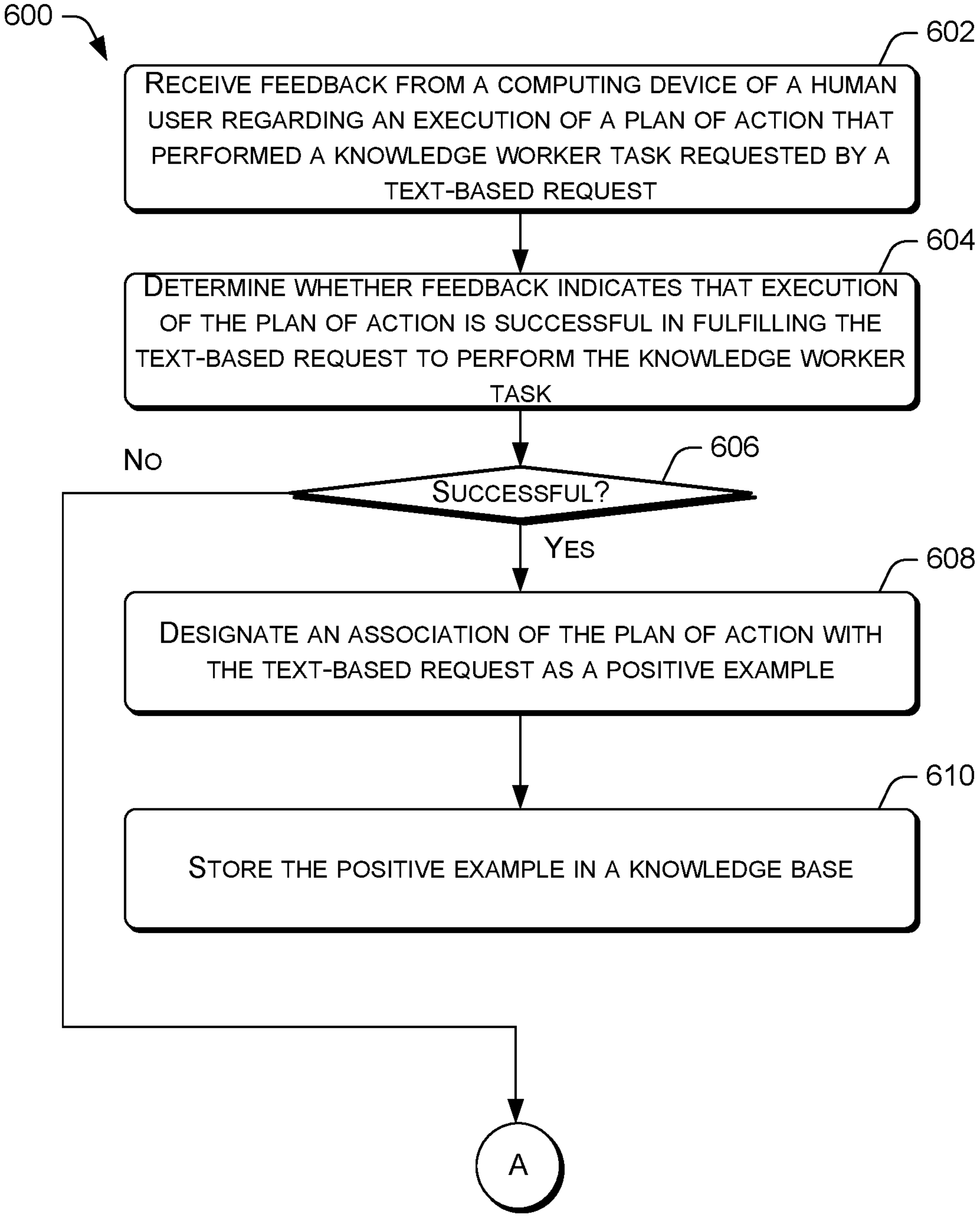
FIGS. 6*a* and 6*b* illustrate a flow diagram of an example process for improving the generation of plans of action that perform knowledge worker tasks.
Figure 6B:
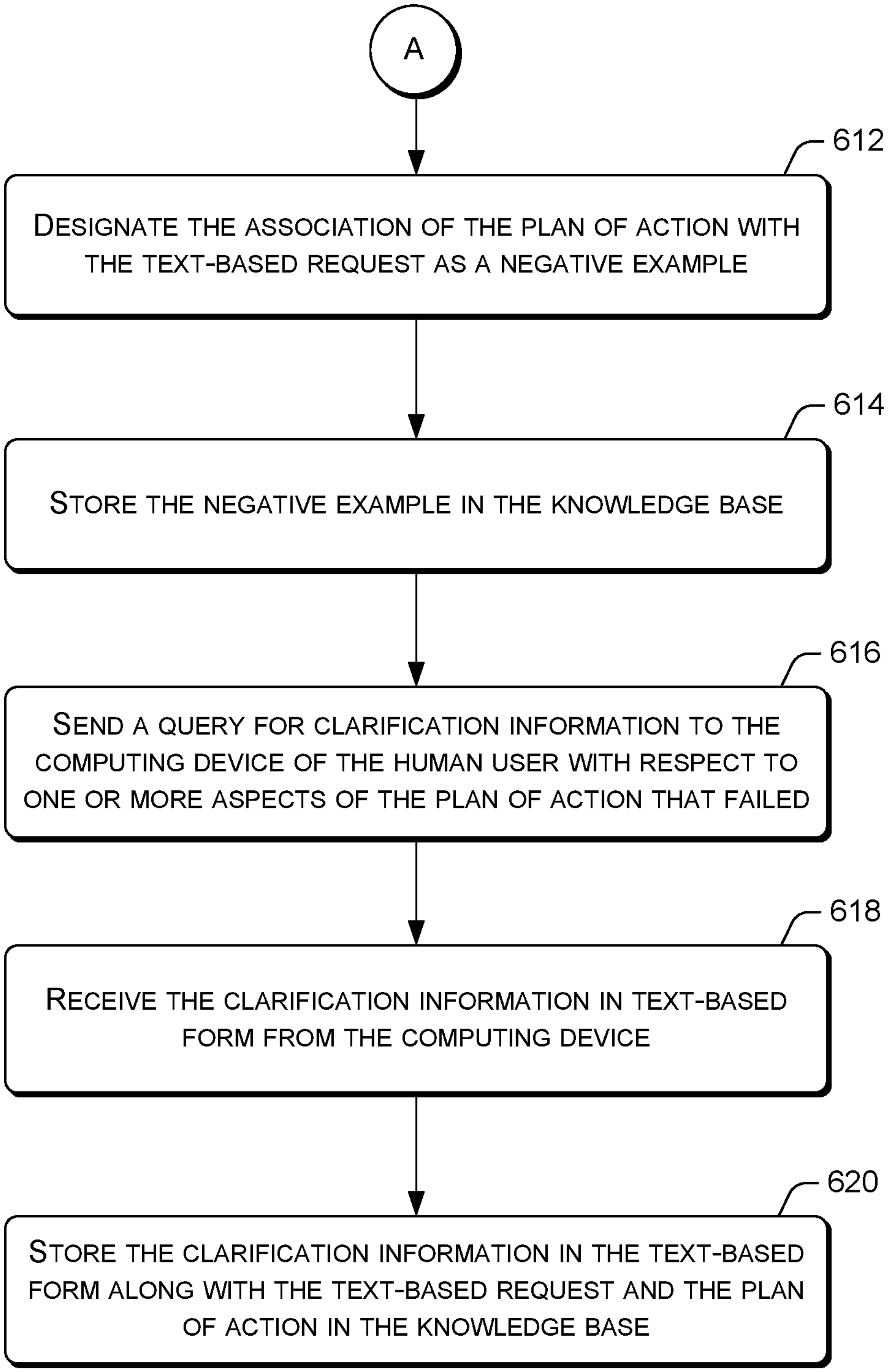

FIGS. 6*a* and 6*b* illustrate a flow diagram of an example process 600 for improving the generation of plans of action that perform knowledge worker tasks. At block 602, the automated general knowledge worker 102 may receive feedback from a computing device of a human user regarding an execution of a plan of action that performed a knowledge worker task requested by a text-based request of the human user. The feedback may be inputted by a human user via an application executing on the computing device. The human user may have inputted the feedback in response to a text-based query that is sent by the automated general knowledge worker 102 to the computing device. In various embodiments, the plan of a new action may be a new plan of action generated for the text-based request or an existing plan of action of a prior text-based request that was mapped to the text-based request.

At block 604, the automated general knowledge worker 102 may determine whether the feedback indicates that the execution of the plan of action is successful in fulfilling the text-based request to perform the knowledge worker task. At decision block 606, if the execution of the plan of action is successful ("yes" at decision block 606), the process 600 may proceed to block 608. At block 608, the automated general knowledge worker 102 may designate an association of the plan of action with the text-based request as a positive example. At block 610, the automated general knowledge worker 102 may store the positive example in the knowledge base 116. In instances in which the plan of action is a new plan of action, the automated general knowledge worker 102 may further store the plan of action and the text-based request that are associated with the positive example in the knowledge base 116. In various embodiments, the positive example may be used as contextual data by the automated general knowledge worker 102 for future generations of plans of action by the NLP 118.

However, if the execution of the plan action is not successful ("no" at decision block 606), the process 600 may proceed to block 612. At block 612, the automated general knowledge worker 102 may designate the association of the plan of action with the text-based request as a negative example. At block 614, the automated general knowledge worker 102 may store the negative example in the knowledge base 116. In instances in which the plan of action is a new plan of action, the automated general knowledge worker 102 may further store the plan of action and the text-based request that are associated with the negative example in the knowledge base 116. In various embodiments, the negative example may be used as contextual data by the automated general knowledge worker 102 for future generations of plans of action by the NLP 118.

At block 616, the automated general knowledge worker 102 may send a query for clarification information to the computing device of the human user with respect to one or more aspects of the plan of action that failed. In various embodiments, the query may be presented to the human user of the organization via an application executing on the computing device.

At block 618, the automated general knowledge worker 102 may receive clarification information in text form from the computing device. In various embodiments, the clarification information may be inputted by a human user via an application of the computing device. At block 620, the automated general knowledge worker 102 may store the clarification information in the text form along with the text-based request and the plan of action in the knowledge base 116. In various embodiments, the clarification information may be used as contextual data by the automated general knowledge worker 102 for future generations of plans of action by the NLP 118.

Figure 7:
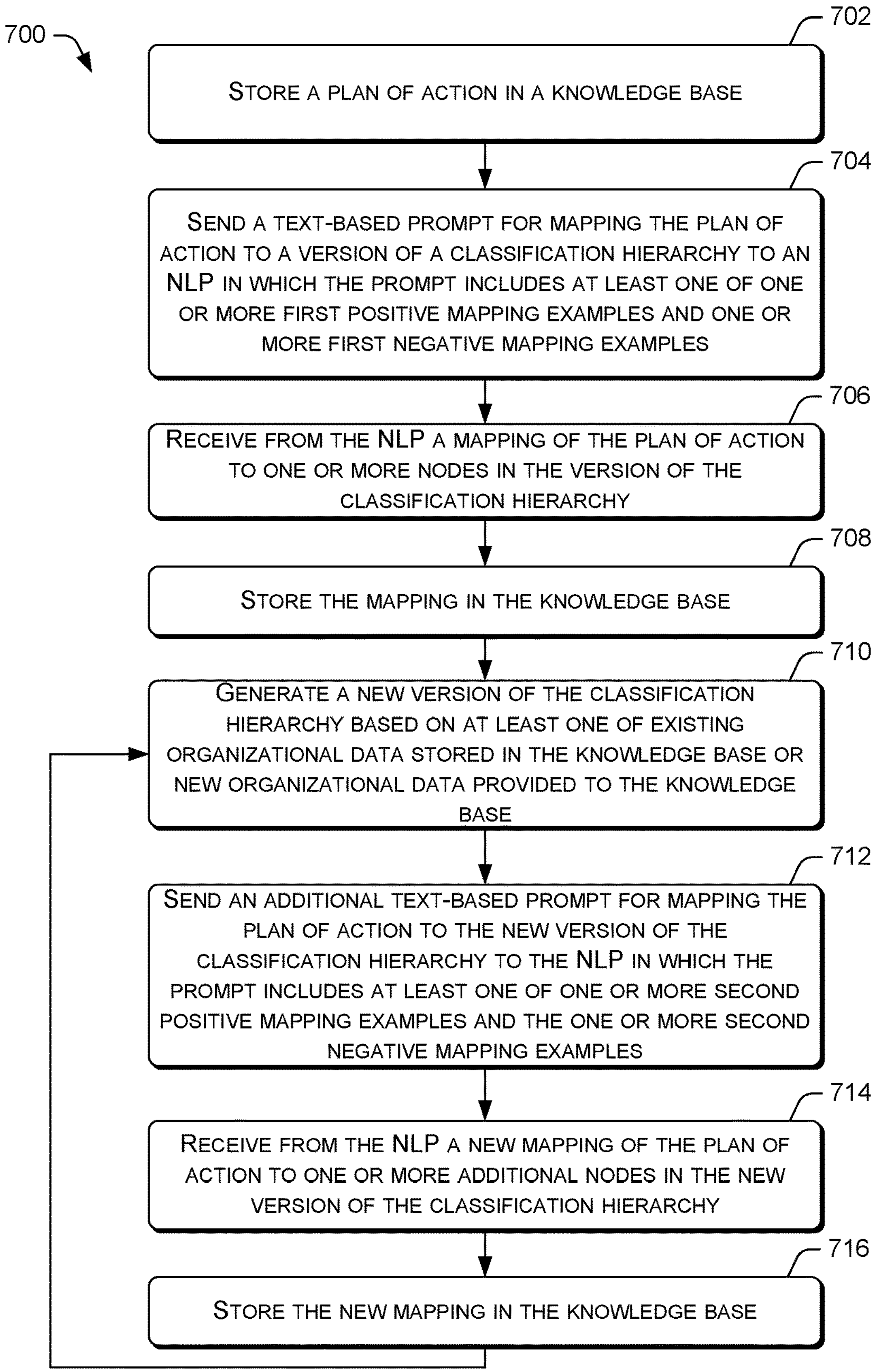
FIG. 7 is a flow diagram of an example process for mapping a plan of action to a classification hierarchy of the organization.

FIG. 7 is a flow diagram of an example process 700 for mapping a plan of action to a classification hierarchy of the organization. At block 702, the automated general knowledge worker 102 may store a plan of action in a knowledge base. In various embodiments, the plan of action may be a generic plan of action or a newly generated plan of action for performing a knowledge worker task for an organization. At block 704, the automated general knowledge worker 102 may send a text-based prompt for mapping the plan of action to a version of a classification hierarchy to the NLP 118, in which the prompt includes at least one of one or more first positive mapping examples and one or more first negative mapping examples. In some embodiments, the version of the classification hierarchy may be a generic version that serves as a seed hierarchy for the organization. At block 706, the automated general knowledge worker 102 may receive from the NLP 118 a mapping of the plan of action to one or more nodes in the version of the classification hierarchy.

At block 708, the automated general knowledge worker 102 may store the mapping in the knowledge base. At block 710, the automated general knowledge worker 102 may generate a new version of the classification hierarchy based on at least one of existing organizational data stored in the knowledge base or new organizational data provided to the knowledge base for the organization. In various embodiments, the new version may be a modified version of the initial version or a version that is completely different from the initial version. At block 712, the automated general knowledge worker 102 may send an additional text-based prompt for mapping the plan of action to the new version of the classification hierarchy to the NLP 118 in which the prompt includes at least one of one or more second positive mapping examples and the one or more second negative mapping examples. At block 714, the automated general knowledge worker 102 may receive from the NLP 118 a new mapping of the plan of action to one or more additional nodes in the new version of the classification hierarchy.

At block 716, the automated general knowledge worker 102 may store the new mapping in the knowledge base. Accordingly, in some embodiments when the automated general knowledge worker 102 determines that a text-based request matches a node of the one or more nodes in a version of the classification hierarchy, the automated general knowledge worker 102 may provide relevant contextual data that includes the plan action that maps to the version of the classification hierarchy or a subcomponent of the plan of action to the NLP for generating a new plan of action. In some instances, the process may loop back to block 710 such that new versions of the classification hierarchy are generated and mapped to plans of action.

Figure 8:
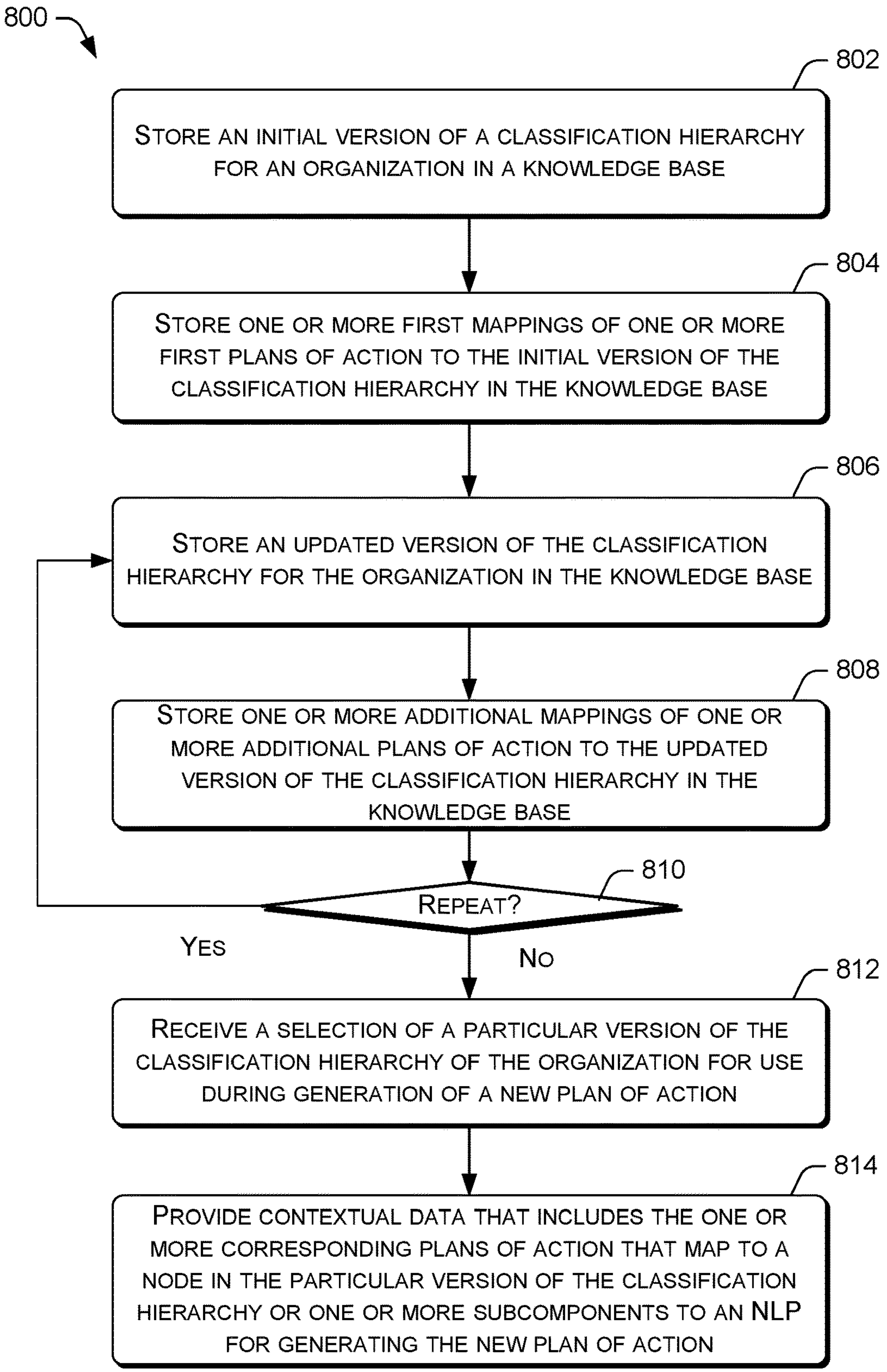
FIG. 8 is a flow diagram of an example process for providing contextual data that includes one or more plans of action that are mapped to a particular version of a classification hierarchy.

FIG. 8 is a flow diagram of an example process 800 for providing contextual data that includes one or more plans of action that are mapped to a particular version of a classification hierarchy. At block 802, the automated general knowledge worker 102 may store an initial version of a classification hierarchy for an organization in a knowledge base. At block 804, the automated general knowledge worker 102 may store one or more first mappings of one or more first plans of action to the initial version of the classification hierarchy in the knowledge base. At block 806, the automated general knowledge worker 102 may store an updated version of the classification hierarchy for the organization in the knowledge base. At block 808, the automated general knowledge worker 102 may store one or more additional mappings of one or more additional plans of action to the updated version of the classification hierarchy in the knowledge base.

At decision block 810, if the automated general knowledge worker 102 determines that an additional updated version of the classification hierarchy is available for repeated storage and mapping ("yes" at decision block 810), the process 800 may loop back to block 806. However, if the automated general knowledge worker 102 determines that an additional updated version of the classification hierarchy is not available for repeated storage and mapping ("no" at decision block 810), the process 800 may proceed to block 812.

At block 812, the automated general knowledge worker 102 may receive a selection of a particular version of the classification hierarchy of the organization for use during the generation of a new plan of action. The particular version may be one of multiple versions of the classification hierarchy. In various embodiments, the selection may be a default selection, an automatic selection for the latest version, or a selection that is manually selected by the administrator 122 via the administrative client application 120. At block 814, the automated general knowledge worker 102 may provide contextual data that includes the one or more corresponding plans of action that map to a node in the particular version of the classification hierarchy or subcomponents of the one or more plans of action to the NLP 118 for generating the new plan of action. In such a scenario, the node in the particular version of the classification hierarchy may match a text-based request for generating the new plan of action.

Figure 9:
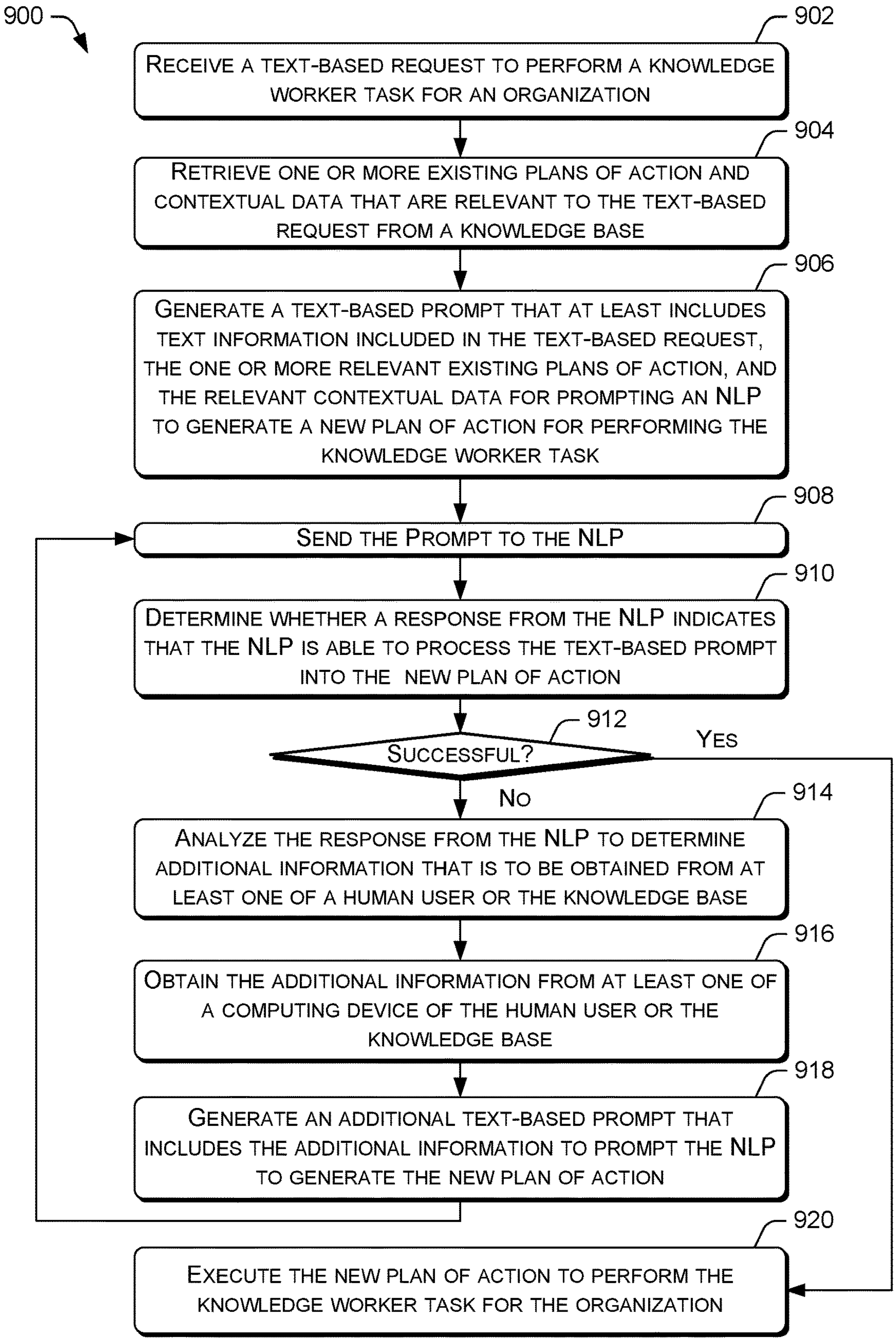
FIG. 9 is a flow diagram of an example process for generating a plan of action for performing a knowledge worker task for an organization using a large language model.

FIG. 9 is a flow diagram of an example process 900 for generating a plan of action for performing a knowledge worker task for an organization using a large language model. At block 902, the automated general knowledge worker 102 may receive a text-based request to perform a knowledge worker task for an organization. In various embodiments, the text-based request may be received from a computing device of a human user. The text-based request may be inputted to the automated general knowledge worker 102 by the human user via an application executing on the computing device. In alternative embodiments, a detected condition may trigger the automated general knowledge worker 102 to proactively generate a text-based request.

At block 904, the automated general knowledge worker 102 may retrieve one or more existing plans of action and contextual data that are relevant to the text-based request from a knowledge base 116. In various embodiments, the automated general knowledge worker 102 may perform such a retrieval following a determination that the text-based request does not map to a previously successfully fulfilled text-based request. In some embodiments, the text-based request and/or the context of the text-based request includes information that matches the data associated with a particular node in a classification hierarchy that is used to classify the organization. Accordingly, the one or more existing plans of action may be retrieved by the automated general knowledge worker 102 from the knowledge base 116 because the one or more existing plans map to the particular node in the classification hierarchy. In some instances, such plan of action retrieval may be performed with respect to multiple classification hierarchies that are used to classify the organization in order to retrieve the one or more existing plans of action. However, in some alternative embodiments, the automated general knowledge worker 102 may not retrieve any existing plans of action from the knowledge base 116. For example, this may be due to the information in the text-based request and/or the context of the text-based request failing to match the data of any node in any classification hierarchy that is used to classify the organization or the lack of mapping of any existing plan of action to one or more matching nodes in one or more classification hierarchies.

At block 906, the automated general knowledge worker 102 may generate a text-based prompt that at least includes text information included in the text-based request, the one or more relevant existing plans of action, and the other relevant contextual data for prompting an NLP 118 to generate a new plan of action for performing the knowledge worker task. However, in some alternative embodiments, the text-based prompt generated by the automated general knowledge worker may lack any relevant existing plans of action. For example, the automated general knowledge worker 102 may be unable to retrieve any relevant existing plans of action from the knowledge base 116 at block 904. In various embodiments, the NLP 118 may be in the form of an LLM that provides natural language processing. In some embodiments, the relevant contextual data may include plan data in the form of plan formatting instructions for formatting the one or more existing plans or one or more subcomponents of the one or more existing plans into the new plan of action. For example, in some instances, the plan formatting instructions may specify one or more subcomponents of each existing plan of action that are to be used to generate the new plan of action. In another example, the plan formatting instructions may call for the new plan of action to be formatted in natural language form, in machine language form, or in a combination of natural language form and machine language form.

At block 908, the automated general knowledge worker 102 may send the text-based prompt to the NLP 118. In turn, the NLP 118 may attempt to process the text-based prompt to generate the new plan of action based on the one or more existing plans or one or more subcomponents of the one or more existing plans. At block 910, the automated general knowledge worker 102 may determine whether a response from the NLP 118 indicates that the NLP 118 is able to process the text-based prompt into the new plan of action.

At decision block 912, if the response from the NLP 118 indicates that the NLP 118 was not able to successfully process the text-based prompt ("no" at decision block 914), the process 900 may proceed to block 914. At block 914, the automated general knowledge worker 102 may analyze the response from the NLP 118 to determine additional information that is to be obtained from at least one of a human user or the knowledge base 116 in order for the NLP 118 to process the text-based prompt into the new plan of action. For example, the response from the NLP 118 may indicate one or more pieces of missing information (e.g., missing application data, missing data processing parameter values, missing resource references, and/or so forth) that caused the NLP 118 to be unable to process the text-based prompt.

At block 916, the automated general knowledge worker 102 may obtain the additional information from at least one of the human user or the knowledge base. For example, the automated general knowledge worker 102 may be able to locate and retrieve the additional information in the knowledge base 116. However, if the automated general knowledge worker 102 is unable to locate any of the additional information, the automated general knowledge worker 102 may use the language interface 104 to request the additional information from a human user via the text-based query sent to a computing device of the human user. In turn, the human user may provide text-based input that includes the additional information to the computing device. In turn, the computing device of the human user may send the additional information to the automated general knowledge worker 102. Alternatively, the automated general knowledge worker 102 may locate a portion of the additional information in the knowledge base 116, and also query and receive another portion of the additional information from the human user.

At block 918, the automated general knowledge worker 102 may generate an additional text-based prompt that includes the additional information to prompt the NLP 118 to generate the new plan of action. In such embodiments, the additional text-based prompt may include the content of the previous text-based prompt sent to the NLP 118, as well as the additional information. Subsequently, the process 900 may loop back to block 908.

Returning to decision block 912, if the response from the NLP 118 indicates that the NLP 118 was able to successfully generate the new plan of action ("yes" at decision block 920), the process 900 may proceed to block 920. At block 920, the automated general knowledge worker 102 may execute the new plan of action to perform the knowledge worker task for the organization. In various embodiments, the plan execution module 320 may implement an execution of a plan of action by directing specific software agents (e.g., one or more of the software agents 322), APIs of applications, and/or other programmatic application mechanisms to execute instruction sets (e.g., machine-executable commands) according to parameters included in the plan of action. Alternatively, or concurrently, the plan execution module 320 may use an interpreter function to translate the text-based directions and parameters included in the plan of action into machine-executable commands for specific software agents, APIs of applications, and/or other programmatic application mechanisms, and then send the machine-executable commands to such mechanisms at the appropriate date and time for execution.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:

receiving a text-based request to perform a knowledge worker task for an organization from a computing device;

searching a knowledge base to at least obtain contextual data of the organization that are relevant to the text-based request;

providing text information included in the text-based request and the contextual data obtained from the knowledge base in text form to a natural language processor (NLP) to prompt the NLP to generate a new plan of action for performing the knowledge worker task in fulfillment of the text-based request;

executing the new plan of action to perform the knowledge worker task;

receiving feedback from the computing device regarding the execution of the new plan of action;

in response to determining that the feedback indicates that the new plan of action is successful in fulfilling the text-based request, designating an association of the new plan of action with the text-based request as a positive example and storing the positive example in the knowledge base as a part of the contextual data of the organization; and in response to determining that the feedback indicates that the new plan of action is unsuccessful in fulfilling the text-based request, designating an association of the new plan of action with the text-based request as a negative example and storing the negative example in the knowledge base as a part of the contextual data of the organization, wherein the positive example or the negative example is included as contextual data in a text-based prompt provided to the NLP for generation of additional plans of action.

2. The one or more non-transitory computer-readable media of claim 1, wherein the text-based request is inputted by a human user at the computing device.

3. The one or more non-transitory computer-readable media of claim 1, wherein the NLP includes a language model.

4. The one or more non-transitory computer-readable media of claim 1, wherein the searching the knowledge base, the providing the text information, and the executing the new plan of action are performed in response to determining that the text-based request does not map to a prior text-based request that was previously successfully fulfilled to perform a previous knowledge worker task.

5. The one or more non-transitory computer-readable media of claim 4, wherein the acts further comprise in response to determining that the text-based request maps to the prior text-based request, executing an existing plan of action associated with the prior text-based request that was previously successfully fulfilled based on one or more parameters in the text-based request to perform the knowledge worker task.

6. The one or more non-transitory computer-readable media of claim 4, wherein the acts further comprise, in response to a determining that the text-based request maps ambiguously to the prior text-based request, sending a text-based query to the computing device requesting additional information regarding the text-based request to perform the knowledge worker task;

receiving a text-based input that includes the additional information from the computing device in response to the text-based query; and supplementing the text-based request with the additional information received from the computing device.

7. The one or more non-transitory computer-readable media of claim 6, wherein the text-based input is provided to the computing device by a human user.

8. The one or more non-transitory computer-readable media of claim 4, wherein the acts further comprise:

receiving feedback from the computing device regarding an execution of a particular plan of action, the particular plan of action being the new plan of action or an existing plan of action in response to determining that the feedback indicates that the plan of action is successful in fulfilling the text-based request to perform the knowledge worker task for the organization, designating a first association of the particular plan of action with the text-based request as a positive example and store the positive example in the knowledge base in the knowledge base as a part of the contextual data of the organization; and in response to determining that the feedback indicates that the plan of action is unsuccessful in fulfilling the text-based request to perform the knowledge worker task for the organization, designating a second association of the particular plan of action with the text-based request as a negative example and store the negative example in the knowledge base as a part of the contextual data of the organization.

9. The one or more non-transitory computer-readable media of claim 8, wherein further in response to determining that the feedback indicates that the plan of action is unsuccessful in fulfilling the text-based request, sending a query for clarification information to the computing device with respect to one or more aspects of the plan of action that failed;

receiving the clarification information in text form from the computing device; and storing the clarification information in the text form along with the text-based request and the particular plan of action in the knowledge base as a part of the contextual data of the organization.

10. The one or more non-transitory computer-readable media of claim 8, wherein the positive example and the negative example are used by the NLP to generate additional plans of action for the organization.

11. The one or more non-transitory computer-readable media of claim 1, wherein the acts further comprise:

receiving a text-based query for additional information from the NLP as the NLP is generating the new plan of action; and providing the additional information in text form to the NLP in response to the text-based query, the additional information including information that is at least one of retrieved from the knowledge base or inputted at the computing device such that the NLP continues the generation of the new plan of action.

12. The one or more non-transitory computer-readable media of claim 1, wherein the contextual data that is relevant to the text-based request includes include at least one of application data, organizational data, task data, or plan data of the organization.

13. The one or more non-transitory computer-readable media of claim 12, wherein the plan data includes one or more existing plans of action or subcomponents of the one or more existing plans of action.

14. The one or more non-transitory computer-readable media of claim 1, wherein the searching includes searching the knowledge base to obtain contextual data of multiple organizations that are relevant to the text-based request, the multiple organizations including the organization.

15. The one or more non-transitory computer-readable media of claim 1, wherein the acts further comprise:

generating an additional text-based request to perform an additional knowledge worker task for the organization in response to a detection of a condition that affects the organization;

searching the knowledge base to at least obtain additional contextual data of the organization that are relevant to the additional text-based request;

providing text information included in the additional text-based request and the additional contextual data obtained from the knowledge base in text form to the NLP to prompt the NLP to generate an additional new plan of action for performing the additional knowledge worker task; and executing the additional new plan of action to perform the additional knowledge worker task for the organization.

16. A computer-implemented method, comprising:

receiving a text-based request to perform a knowledge worker task for an organization from a computing device;

in response to mapping the text-based request to a prior text-based request that was previously successfully fulfilled to perform a previous knowledge worker task, executing an existing plan of action associated with the prior text-based request that was previously successfully fulfilled based on one or more parameters in the text-based request to perform the knowledge worker task;

receiving feedback from the computing device regarding the execution of the existing plan of action;

in response to determining that the feedback indicates that the existing plan of action is successful in fulfilling the text-based request, designating an association of the existing plan of action with the text-based request as a positive example and storing the positive example in a knowledge base as a part of contextual data of the organization; and in response to determining that the feedback indicates that the existing plan of action is unsuccessful in fulfilling the text-based request, designating an association of the existing plan of action with the text-based request as a negative example and storing the negative example in the knowledge base as a part of the contextual data of the organization.

17. The computer-implemented method of claim 16, further comprising, in response to determining that the text-based request does not map to the prior text-based request, searching a knowledge base to at least obtain contextual data of the organization that are relevant to the text-based request;

providing text information included in the text-based request and the contextual data obtained from the knowledge base in text form to a natural language processor (NLP) to prompt the NLP to generate a new plan of action for performing the knowledge worker task; and executing the new plan of action to perform the knowledge worker task for the organization.

18. The computer-implemented method of claim 17, wherein the NLP includes a language model.

19. The computer-implemented method of claim 16, wherein the text-based request is inputted by a human user at the computing device.

20. A system, comprising:

one or more processors; and memory including a plurality of computer-executable components that are executable by the one or more processors to perform a plurality of actions, the plurality of actions comprising:

generating a text-based request to perform a knowledge worker task for an organization in response to a detection of a condition that affects the organization;

searching a knowledge base to at least obtain contextual data of the organization that are relevant to the text-based request;

providing text information included in the text-based request and the contextual data obtained from the knowledge base in text form to a natural language processor (NLP) to prompt the NLP to generate a new plan of action for performing the knowledge worker task;

executing the new plan of action to perform the knowledge worker task for the organization;

receiving feedback from a computing device regarding the execution of the new plan of action;

in response to determining that the feedback indicates that the new plan of action is successful in fulfilling the text-based request, designating an association of the new plan of action with the text-based request as a positive example and storing the positive example in the knowledge base as a part of the contextual data of the organization; and in response to determining that the feedback indicates that the new plan of action is unsuccessful in fulfilling the text-based request, designating an association of the new plan of action with the text-based request as a negative example and storing the negative example in the knowledge base as a part of the contextual data of the organization, wherein the positive example or the negative example is included as contextual data in a text-based prompt provided to the NLP for generation of additional plans of action.

* * * * *